(12) United States Patent
Nishibashi

(10) Patent No.: US 8,478,438 B2
(45) Date of Patent: Jul. 2, 2013

(54) NUMERICAL CONTROL DEVICE

(75) Inventor: Nobutaka Nishibashi, Osaka (JP)

(73) Assignee: Shin Nippon Koki Co., Ltd. (JP)

( * ) Notice: Subject to any disclaimer, the term of this patent is extended or adjusted under 35 U.S.C. 154(b) by 320 days.

(21) Appl. No.: 13/119,001

(22) PCT Filed: Sep. 16, 2008

(86) PCT No.: PCT/JP2008/066663
§ 371 (c)(1),
(2), (4) Date: Mar. 15, 2011

(87) PCT Pub. No.: WO2010/032284
PCT Pub. Date: Mar. 25, 2010

(65) Prior Publication Data
US 2011/0166693 A1    Jul. 7, 2011

(51) Int. Cl.
*G06F 19/00* (2006.01)
*G05B 19/10* (2006.01)
*G05B 19/408* (2006.01)

(52) U.S. Cl.
USPC ........... 700/159; 700/181; 700/184; 700/189; 700/193; 700/194; 318/567; 318/568.1; 318/568.11; 318/568.17; 318/568.23

(58) Field of Classification Search
USPC ................. 700/159–160, 181, 184, 187–189, 700/192–194; 318/567, 568.1, 568.11, 568.17–568.19, 568.23
See application file for complete search history.

(56) References Cited

U.S. PATENT DOCUMENTS

| | | | | |
|---|---|---|---|---|
| 3,882,304 A * | 5/1975 | Walters | | 700/163 |
| 4,509,126 A * | 4/1985 | Olig et al. | | 700/173 |
| 4,723,203 A * | 2/1988 | Kishi et al. | | 700/184 |
| 4,818,925 A * | 4/1989 | Lahm et al. | | 318/567 |
| 5,091,861 A * | 2/1992 | Geller et al. | | 700/192 |
| 6,401,006 B1 | 6/2002 | Mizuno et al. | | |
| 6,438,445 B1 * | 8/2002 | Yoshida et al. | | 700/173 |
| 6,772,020 B2 * | 8/2004 | Kohler et al. | | 700/73 |
| 6,922,607 B2 * | 7/2005 | Yamazaki et al. | | 700/188 |
| 6,942,436 B2 * | 9/2005 | Kakino et al. | | 409/84 |
| 7,039,494 B2 | 5/2006 | Otsuki et al. | | |

(Continued)

FOREIGN PATENT DOCUMENTS

| JP | 50-112969 | 9/1975 |
|---|---|---|
| JP | 5-108134 | 4/1993 |

(Continued)

*Primary Examiner* — Ramesh Patel
(74) *Attorney, Agent, or Firm* — Gerald E. Hespos; Michael J. Porco; Matthew T. Hespos

(57) ABSTRACT

A main control process is made common to all machine tools by describing in a NC program a tool trajectory including a change in posture in a coordinate system (30) fixed to a machining object (W), fixedly arranging a preparatory reference coordinate system (20) on a machine table (2), representing an installation position of the machining object (W) and a position of a spindle (91) on which a tool (11) is mounted in the preparatory reference coordinate system (20), and containing portions relating to a configuration of axes in a conversion function group of correlation between the position (q) of the spindle (91) and an axis coordinate (r). Thus, the processes of reading the NC program, correction of the tool trajectory and conversion into the trajectory of a spindle position based on the installation position of the machining object, the tool shape, and tool dimensions are made completely common.

4 Claims, 22 Drawing Sheets

U.S. PATENT DOCUMENTS

| | | | |
|---|---|---|---|
| 7,248,012 B2 * | 7/2007 | Takahashi et al. | 318/568.13 |
| 7,341,822 B2 | 3/2008 | Van Der Sande | |
| 7,356,937 B2 * | 4/2008 | Nishibashi et al. | 33/502 |
| 7,386,408 B2 * | 6/2008 | Nishibashi et al. | 702/94 |
| 7,433,754 B2 * | 10/2008 | Otsuki et al. | 700/159 |
| 7,860,601 B2 * | 12/2010 | Piggott et al. | 700/175 |
| 8,155,781 B2 * | 4/2012 | Birzer et al. | 700/189 |
| 2004/0166425 A1 | 8/2004 | Van Der Sande | |
| 2005/0033459 A1 | 2/2005 | Otsuki et al. | |
| 2007/0138374 A1 * | 6/2007 | Nishibashi et al. | 250/208.1 |
| 2009/0295323 A1 | 12/2009 | Papiernik et al. | |
| 2011/0015877 A1 * | 1/2011 | Okita et al. | 702/41 |
| 2011/0153057 A1 * | 6/2011 | Nishibashi | 700/192 |

FOREIGN PATENT DOCUMENTS

| | | |
|---|---|---|
| JP | 11-149306 | 6/1999 |
| JP | 2000-250615 | 9/2000 |
| JP | 2001-92508 | 4/2001 |
| JP | 2001-175315 | 6/2001 |
| JP | 2003-195917 | 7/2003 |
| JP | 2004-280798 | 10/2004 |
| JP | 2005-56171 | 3/2005 |
| JP | 2006-53636 | 2/2006 |
| JP | 2008-523487 | 7/2008 |

* cited by examiner

NUMERICAL CONTROL DEVICE

BACKGROUND OF THE INVENTION

1. Field of the Invention

The present invention relates to a software structuring technique and an acceleration/deceleration control technique by which practically the entire control software is made to be common to all machine tools in numerical control of machine tools in any mechanical structure such as parallel mechanism machine tools and five-axis machine tools of various forms.

2. Description of the Prior Art

Machine tools of different kinds are known, and the control systems thereof are established by configurations of axes driven by motors. The configurations of axes differ between the machine tools such as a simultaneous two-axis control lathe, a simultaneous three-axis control machining center, a head-side rotation-type five-axis machine tool, a table rotation five-axis machine tool, a mixed mode five-axis machine tool, and a parallel mechanism machine tool.

In such various machine tools, a program coordinate system is defined and a movement trajectory of a tool in the program coordinate system is described in a NC program. It is a role of the numerical control device to operate the machine tool by driving the axes on the basis of the NC program. A numerical control process in a five-axis machine tool includes a tool length correction in five axes, a tool diameter correction in five axes, an interpolation control for accurately moving a tool tip in five axes, and a feed acceleration/deceleration control for clean rapid machining. Computation for each control is required to be based of rotating axes. Further, a computation method should be changed according to the configuration of axes. Therefore, changes corresponding to an axis configuration are unavoidable in each control process. Thus, technical examination is repeated each time the configuration of axes is changed, and where specific features are changed, functions that have similar but different portions are actuated each time the change is made. As a result, a plurality of functions are entangled and complexity is increased. For example, the tool length correction in five axes, interpolation control for accurately moving a tool tip in five axes, and feed acceleration/deceleration control for clean rapid machining are integrated together and cannot be separated from each other.

Further portions of the control processes relating to the configuration of axes should be extracted and converted to a black box, each control process should be simplified, and each control process should be facilitated by making common as many portions of the control processes as possible, but the extraction of portions relating to the configuration of axes is incomplete and the conversion to a black box is impossible. As a result, the software greatly increases in size and complexity and the development time and maintenance time are increased. This state will be explained below with reference to five-axis machine tools of two types and a parallel mechanism machine tool.

A five-axis machine tool usually has a total of five axes: three axes composed of XYZ linear axes and two rotating axes. The three linear axes are usually perpendicular to each other. The two rotating axes are designed to rotate a head side having a spindle, rotate a machine table having a work disposed thereon, or rotate the head and the machine table, respectively.

At the initial stage of numerical control of a head rotation-type five-axis machine tool, a work coordinate system parallel to the three XYZ linear axes is set as a NC program coordinate system, coordinate values in the work coordinate system of control points, which are the rotation centers of the rotating axes are found, and the machine tool is controlled by a NC program in which the operation of the machine tool is described by the rotating axis coordinates and the coordinate values of the control points in the work coordinate system. In such NC program the movement of the control points for cutting the work is described, without describing the movement trajectory of the tool.

The NC program of control point movement is created anew if the tool length changes. Accordingly, the problem is to create a numerical control that can be used as is even when a tool length changes. This problem has been resolved by a tool tip control in which the tool movement is described in coordinates of a tool tip. Thus, the aforementioned problem has been resolved by computing the coordinate values of control points correspondingly to the actual tool length and tool tilt and operating the machine tool on the basis of the calculated coordinate values.

However, this approach cannot be directly applied to a five-axis machine tool of a table rotation type that has a rotating axis that rotates the table. This is because the work rotates as the table rotates and therefore a parallel relationship of the coordinate system of the work and the XYZ coordinate axes of the machine tool is lost. This problem has been resolved, as described in Japanese Patent Application Publication No. 2003-195917, by taking a coordinate system rotating together with the machine table as a program coordinate system, describing a movement trajectory of the tool in the program coordinate system in the NC program, and using a five-axis conversion by which the movement trajectory of the tool is converted into axis coordinates by also taking the coordinate conversion that follows the table rotation into account. In other words, the tool tip control functions having the same objective have been developed as similar but different functions. However, in these tool tip control functions, the commands are different and important issues relating to usage are also different. Similarly to the tool tip control functions, five-axis tool diameter correction functions that shift a tool path by a designated correction amount have also been developed as similar but different functions for different axis configuration, although these functions have the same objective.

A parallel machine tool will be described below. From the user's standpoint, a parallel machine tool is identical to a five-axis machine tool. If the features of a parallel machine tool were almost common to other five-axis machine tools, the parallel machine tools would be developed rapidly and at a low cost. However, numerical control of parallel mechanism machine tools actually tends to be difficult and is handled in a special way. For example, Japanese Patent Application Publication No. H11-149306 describes a control in which smooth speed variations of a machining tool are enabled to improve the machining accuracy of a machine tool. Japanese Patent Application Publication No. 2005-56171 describes controlling a feed speed of each axis of a machine tool having axes that are not in the orthogonal coordinate system in a parallel mechanism machine tool or the like. Japanese Patent Application Publication No. 2001-92508 describes an invention relating to a control of a parallel mechanism machine tool. The description of Japanese Patent Application Publication No. 2001-92508 shows that each time a control of a parallel mechanism machine tool is developed, it is a time-consuming procedure.

In order to realize the control of parallel mechanism machine tools by using the techniques described in the aforementioned patent documents, a significant amount of work has been required or will be required in the future. A parallel mechanism machine tool is absolutely identical to other five-axis machine tool in that the control is realized with respect to a movement trajectory of a tool, and except for a difference in inverse kinematic relationship, all other differences should be ignored. Therefore, it will be little wonder if a numerical control device is realized that is constituted by software common to all machine tools including a parallel mechanism machine tool.

The acceleration/deceleration control will be explained below. Before the technique described in Japanese Patent Application Publication No. H11-149306 was developed, B acceleration/deceleration explained in FIG. 3 of Japanese Patent Application Publication No. H11-149306 was indispensable, but a final path included a path error caused by the B acceleration/deceleration. This path error is called an internal rotation error and considered to have a specific feature of assuming a value almost proportional to a second power of speed and a second power of a mechanical constant called a time constant. The time constant is a mechanical parameter corresponding to an allowed acceleration and is set to a small value if the allowed acceleration is high and to a large value is the allowed acceleration is low. Thus, in a large machine tool, the allowed acceleration is relatively small and therefore a large time constant is set. Where the B acceleration/deceleration is used to obtain smooth acceleration/deceleration of the machine tool, the path error, that is, the internal rotation error, is generated and the speed should be reduced to fit this error into an allowed range. Japanese Patent Application Publication No. H11-149306 discloses a technique for which the B acceleration/deceleration is unnecessary, a circular arc interpolation being an example thereof. Such a system is effective in the case of an inherently smooth curve such as a circular arc, but is not necessarily effective in applications to a NC program that describes a movement trajectory of a tool by a set of short linear command blocks that are typically used. This is because in the case of short linear blocks, the result of first-order interpolation described in Japanese Patent Application Publication No. H11-149306 is randomly produced on the original polygonal line since a tool path is bent on the boundaries of blocks, and therefore subsequent smooth polynomial interpolation is impossible. Further, a method of changing the tool path into a smooth curve that is called "nano-smoothing" has also been suggested, but the conditions under which the tool path can be smoothly changed by nano-smoothing are limited. For example, the conversion into a curve is impossible between the points in which angular deflection of the orientation of an advance direction vector of the tool path is too large. Therefore, when the control is performed on the basis of a NC program including sets of short linear blocks, which are typically used, it is impossible not to use the B acceleration-deceleration. Where the B acceleration/deceleration is used, the internal rotation error is generated in a smooth movement such as circular arc interpolation. Therefore, even when the movement at a higher speed is mechanically possible, since the internal rotation error is contained in the allowed value, the speed should be reduced. As a result, an acceleration/deceleration control is required that is effective with respect to any tool path and free from such speed reduction. Furthermore, it would be ideal if the acceleration/deceleration control can be commonly used by all machine tools.

There is also a machine tool that has two mutually parallel axes as an axis configuration and expands a movable area. For example, in a machine tool having W-axis parallel to Z-axis, such as shown in FIG. 1, the movable area in the vertical direction is expanded and works of a larger size can be machined. However, when the Z-axis and the W-axis are used simultaneously, various limitations are involved. Thus, other functions cannot be used, for example, tool diameter correction and circular arc interpolation cannot be used. Accordingly, in such a machine tool, a numerical control device is required that can adequately distribute the use of the Z-axis and W-axis and places no limitations on the use of other functions.

SUMMARY OF THE INVENTION

It is an object of the invention to provide a numerical control device resolving the above-described problems.

In order to attain the above-described object, the numerical control device according to the invention controls a machine tool having at least a spindle for mounting a tool, a spindle head that fixedly holds the spindle, a machine table on which a machining object is fixedly disposed, the relative positional relationship between the spindle head and the machine table including a rotation posture being controlled about a plurality of axes for driving, and motors adapted for drive about each of axes, with a preparatory reference coordinate system, in which orientations of coordinate axes and a position of an original point are fixed, being set on the machine table, the numerical control device having a preparation unit, a first control unit, a second control unit, and a third control unit; wherein the preparation unit has at least an NC program management unit, a preparatory information management unit, and a tool information management unit as segmentalized sub-means; the NC program management unit stores in a preparation information memory unit a NC program having described therein a trajectory of a tool position, which is a position including a tool posture in a program coordinate system fixed to the machining object, a tool path formed of a tool feed speed command indicating a feed speed thereof, and an as-needed tool path correction command; the preparatory information management unit stores in the preparation information memory unit preparatory information, which is information on a position that is in the preparatory reference coordinate system and composed of original point coordinate in the program coordinate system and posture angles indicating orientations of coordinate axis cosines, as an arrangement position including a posture of the machining object to the machine table; the tool information management unit stores in the preparation information memory unit tool information including a shape of the tool used, a length of the tool, and dimensional information on a correction amount of a tool radius; the first control unit has as segmentalized sub-means an NC program read unit and a tool path correction unit; the NC program read unit reads the tool path and the tool path correction command described in the NC program and stores the tool path and the tool path correction command in a path computation memory unit; the tool path correction unit corrects the tool path according to the tool path correction command; the second control unit finds an axis path corresponding to a trajectory of axis coordinates, which are position coordinates about all axes for driving, from the tool path on the basis of the preparatory information and the tool information by taking into account specific features of configuration of the axes for driving, and stores the found axis path in the path computation memory unit; the third control unit finds a movement amount about each axis for driving for each interpolation period from the axis path and outputs the found movement amounts to the motors; the preparation unit further has an axis configuration management unit as segmentalized sub-means; the axis configuration management unit stores in a machine information memory unit a spindle-axis conversion function that converts into the axis coordinates the spindle position based on an inverse kinematic relationship that is determined by the configuration of the axes for driving, the relationship indicating a correlation between the axis coordinates and a spindle position, which is position information obtained by representing a position of the spindle, including the rotation posture thereof, in the preparatory reference coordinate system; the second control unit has a spindle path calculation unit and an axis path calculation unit as segmentalized sub-means; the spindle path calculation unit converts the tool path into a spindle path, which is a trajectory of the spindle position, on the basis of the preparatory information and the tool information, irrespectively of the configuration of the axes for driving, and stores the spindle path in the path computation memory unit; and the axis path calculation unit converts the spindle path into the axis path by using the spindle-axis conversion function, and stores the axis path in the path computation memory unit.

DETAILED DESCRIPTION OF THE PREFERRED EMBODIMENTS

Embodiments of the present invention will be described below with reference to the appended drawings.

Figure 1:
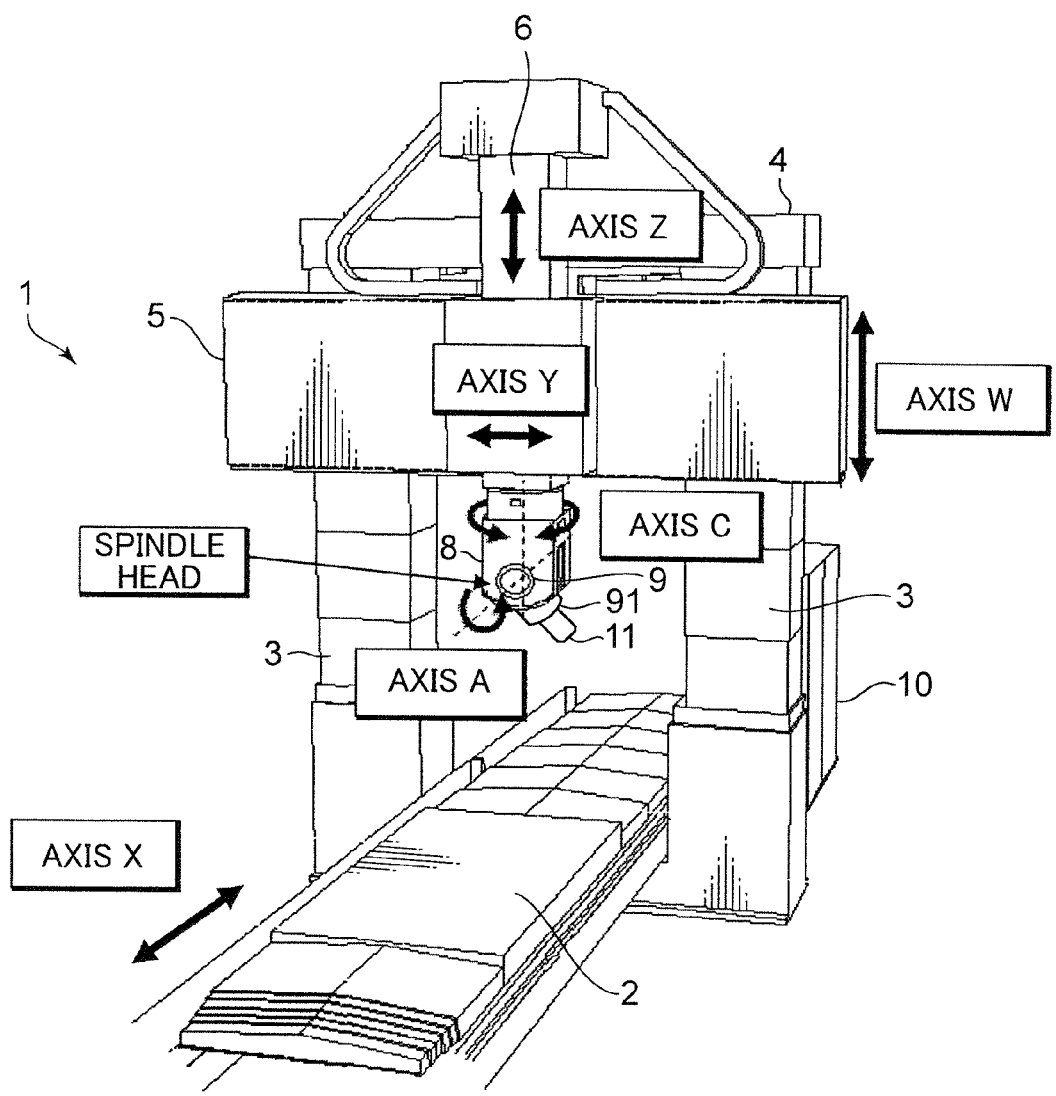
FIG. 1 is a perspective view illustrating the entire five-axis machine tool as an example of machine tool using the present invention.

FIG. 1 is a perspective view showing the entire five-axis machine tool as an example of a machine tool to which the present invention is applied. Referring to FIG. 1, a machine tool 1 has a machine table 2 holding a work as a machining object. The machine table 2 has a front-rear arrangement in the longitudinal direction and configured to be movable in the direction of X-axis for driving (horizontal front-rear direction). A pair of support columns 3, 3 having a ball screw portion (not shown in the figure) are installed vertically on both sides in the intermediate location of the machine table 2, and a beam 4 is spanned between the upper end portions of the support columns 3, 3. A motor MO (see FIG. 14) is disposed as a drive source inside the beam 4. The ball screw portions of the left and right support columns 3, 3 are synchronized via a bevel gear (not shown in the figure) or the like and rotationally driven by the motor MO. Both side portions of a cross rail 5 are meshed with respective ball screw portions of the support columns 3, 3, whereby the cross rail 5 is spanned between the ball screw portions of the support columns 3, 3. As a result, the cross rail 5 can move in the vertical W axis direction along the ball screw portions of the support columns 3, 3.

A head member 6 is supported on the cross rail 5 so that the head member can move in the Y axis direction, which is a left-right direction. The head member 6 is elongated in the vertical direction. Further, the head member 6 is provided so that it can be moved in the Z axis direction, that is, up-down direction, in the cross rail 5. An attachment member 8 for side surface machining that is equipped with an internal spindle head 9 inside thereof is mounted below the head member 6. The spindle head 9 is provided with a spindle 91 that can be horizontally mounted with tools such as a drill. The spindle 91 can rotate at least about one horizontal axis with respect to the spindle head 9. The rotation drive power from the head member 6 is transmitted via the spindle 91 to a tool such as a drill. A drive mechanism of four-axis control performed by the machine table 2, cross rail 5, and head member 6 can be constituted for example by motors MO, ball screws and so on.

A control box 10 is installed close to the machine table 2. The control box 10 can drive control motors MO (see FIG. 14) adapted for drive about respective axes of the table 1, cross rail 5, and head member 6 according to a program inputted by the operator.

Figure 2:
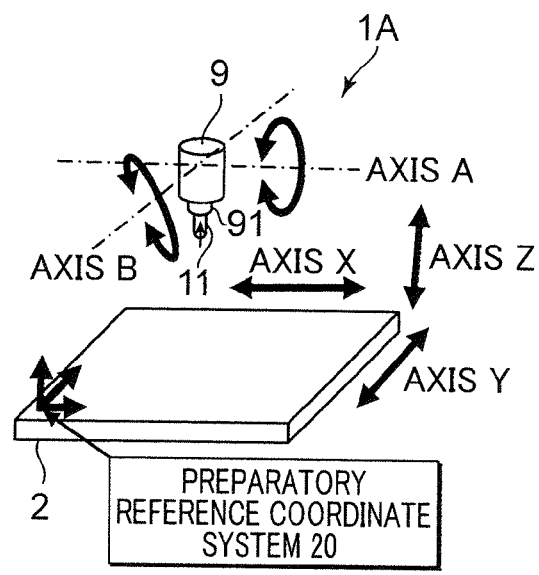
FIG. 2 is a schematic diagram illustrating by way of example a machine tool 1A of a mechanical structure that can use the present invention.
Figure 3:
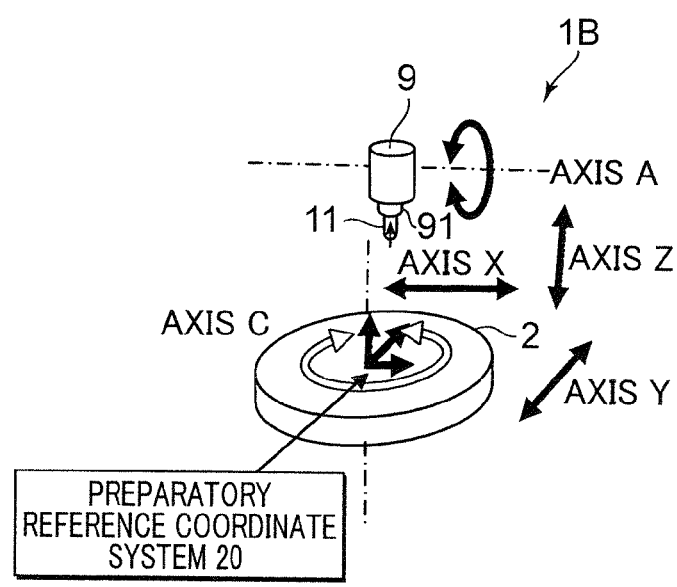
FIG. 3 is a schematic diagram illustrating by way of example a machine tool 1B of a mechanical structure that can use the present invention.
Figure 4:
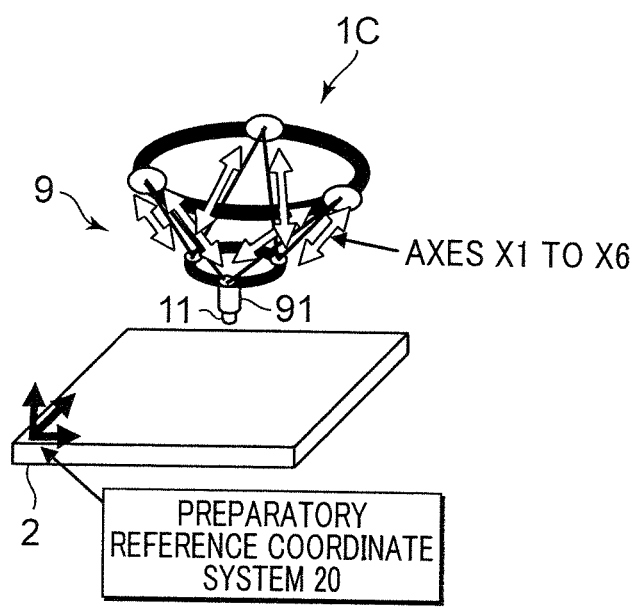
FIG. 4 is a schematic diagram illustrating by way of example a machine tool 1C of a mechanical structure that can use the present invention.
Figure 11:
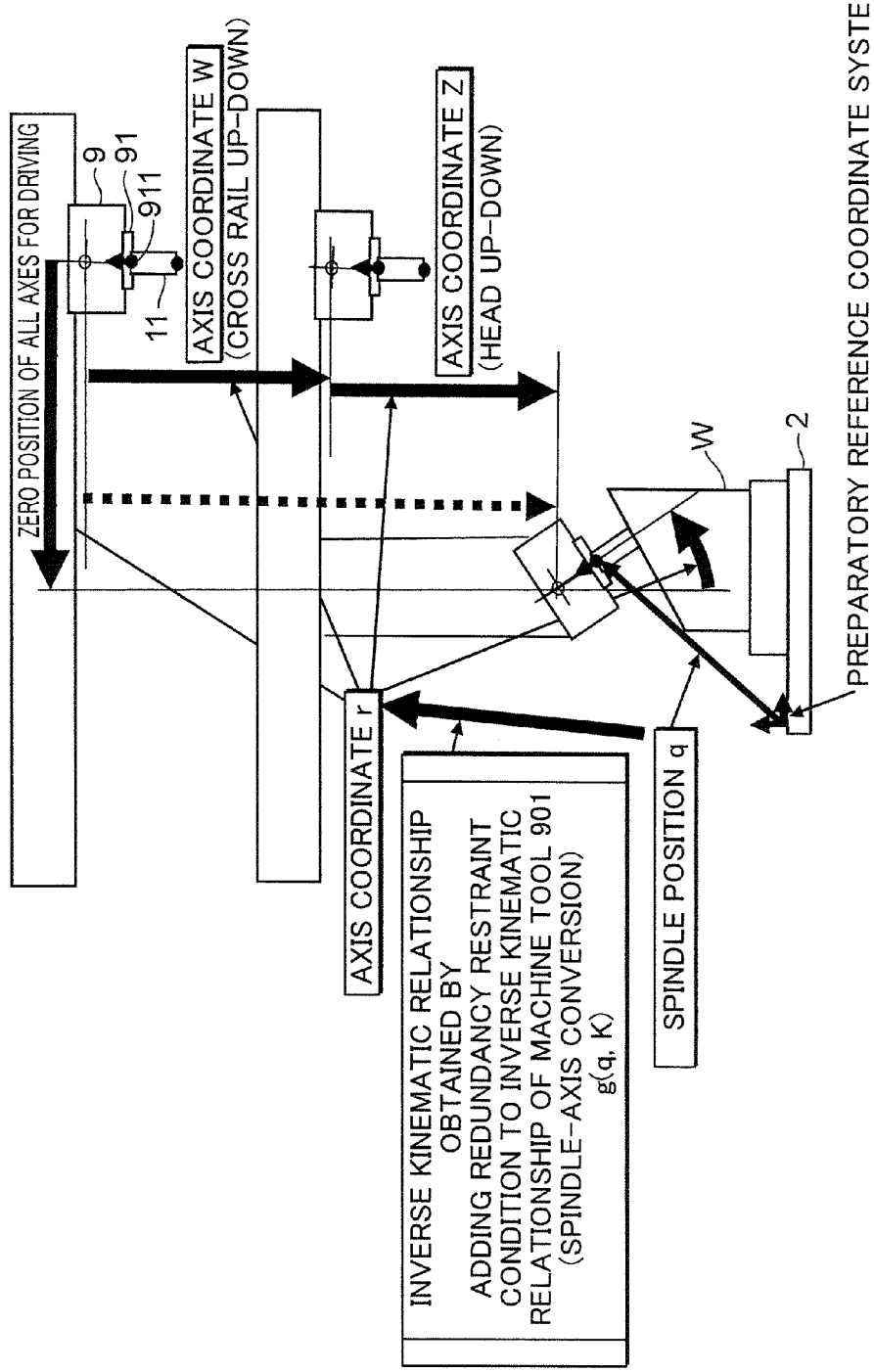
FIG. 11 illustrates a machine tool 1D.
Figure 12:
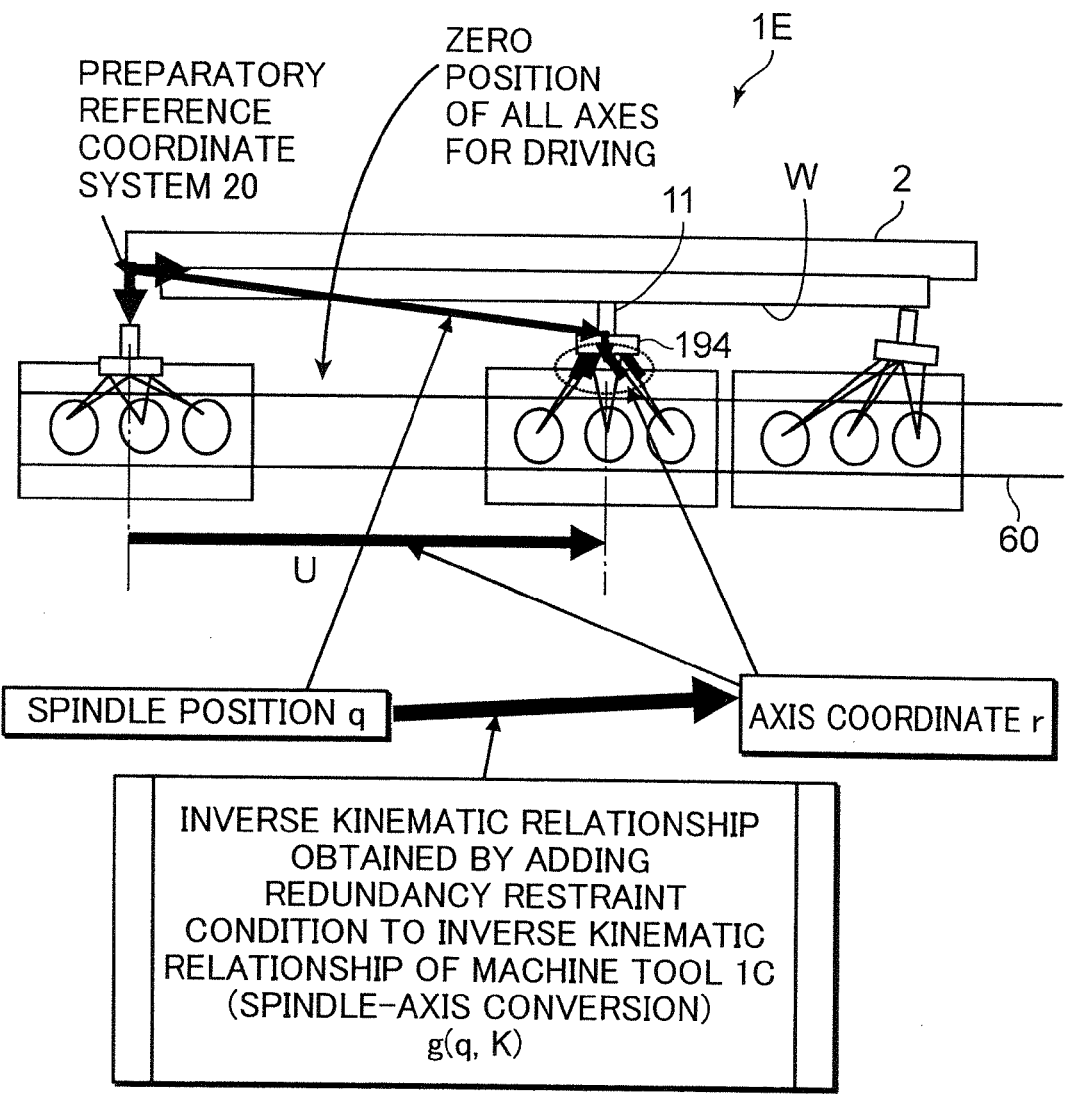
FIG. 12 illustrates a machine tool 1E.
Figure 13:
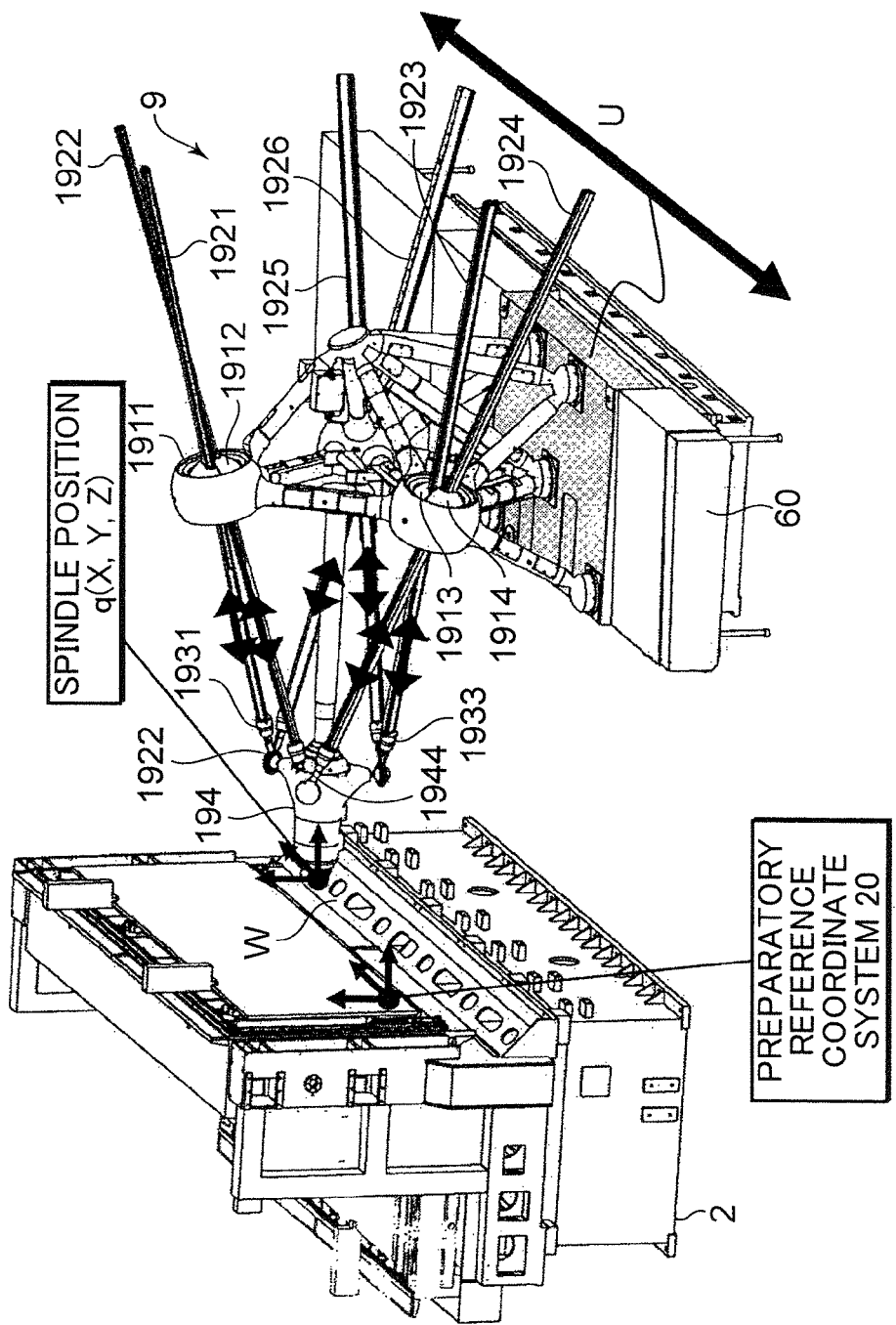
FIG. 13 is a configuration diagram illustrating an embodiment of the machine tool 1E shown in FIG. 12.

FIGS. 2 to 4 are schematic drawings illustrating examples of machine tools of different mechanical structures that can use the present invention. FIG. 2 shows a machine tool 1A, FIG. 3 shows a machine tool 1B, and FIG. 4 shows a machine tool 1C. FIG. 11 shows a machine tool 1D, and FIG. 12 shows a machine tool 1E. The machine tool 1D shown in FIG. 11 is obtained by adding a W axis to the machine tool 1A shown in FIG. 2, and the machine tool 1E shown in FIG. 12 is obtained by adding a U axis to the machine tool 1C shown in FIG. 4. FIG. 13 is a configuration diagram illustrating an embodiment of the machine tool 1E shown in FIG. 12.

As shown in FIGS. 2 to 4 and FIGS. 11 to 13, all of the machine tools have the machine table 2 and the spindle head 9. The machine tools shown in FIGS. 2, 3, and 11 have A-axis for changing the relative positional relationship between the machine table 2 and the spindle head 9, including the rotational postures of the machine table 2 and the spindle head 9, and a drive source such as a motor MO adapted for drive on the A-axis. The spindle 91 having a tool mounted thereon is fixedly attached to the spindle head 9 in the same manner as in the machine tool 1 shown in FIG. 1.

As shown in FIG. 2, the machine tool 1A has five axes for driving, namely, A, B, X, Y, and Z, and a drive source for each axis. The X, Y, Z-axes are perpendicular to each other. Strictly speaking, the machine tool 1A should be classified into different configuration classes depending on the type of parent-child relationship between the A-axis and the B-axis, but in the present embodiment these no such classification will be made since it does not affect the explanation. As shown in FIG. 3, the machine tool 1B has five axes for driving, namely, A, C, X, Y, and Z. The C-axis is an axis about which the machine table 2 is rotated. The X, Y, Z-axes are perpendicular to each other. The machine tool 1C has a parallel mechanism and, as shown in FIG. 4, has six axes for driving, namely, X1, X2, X3, X4, X5, X6. As shown in FIG. 11, the machine tool 1D has six axes for driving, namely, A, B, X, Y, Z, and W, and the Z and W-axes from among these axes are parallel to each other. As shown in FIG. 12, the machine tool 1E has seven axes for driving, namely, X1, X2, X3, X4, X5, X6, and U.

In each machine tool, a preparatory reference coordinate system 20 that fixes an original point and a posture in rotation direction on the machine table 2 is established as a right-handed orthogonal coordinate system. The preparatory reference coordinate system 20 is set in a position such that a posture and a position from a structural reference can be stipulated. The preparatory reference coordinate system 20 is in principle unchangeable after it has been established on the machine table 2 and can be stipulated, for example, in the following manner. In the machine tool 1A, the preparatory reference coordinate system 20 is established that has coordinate axes respectively parallel to X, Y, Z-axes. In the machine tool 1B, the preparatory reference coordinate system 20 is established that has coordinate axes respectively parallel to X, Y, Z-axes when the coordinate about the C-axis is zero and has an intersection point of the machine table 2 and a rotation center axis of the C-axis as an original point. In the machine tool 1C, there are actually no axes for driving constituting an orthogonal system of coordinate and therefore the preparatory reference coordinate system 20 is established in an appropriate predetermined position on the machine table 2. In the machine tools 1D, 1E shown in FIGS. 11 and 12, the preparatory reference coordinate system 20 is similarly set in a predetermined position on the machine table 2. This will be explained hereinbelow in greater detail.

Figure 5:
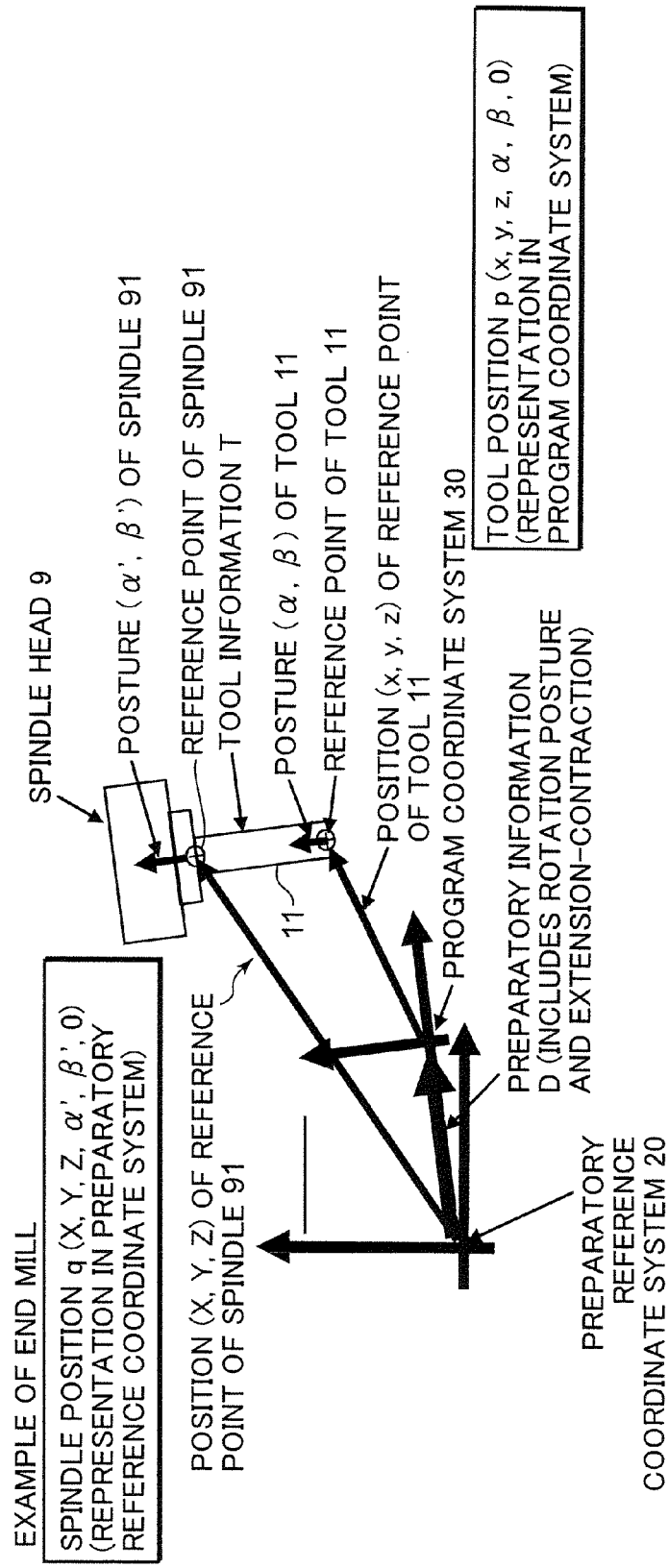
FIG. 5 is a schematic diagram showing an example of an end mill; this figure illustrates the relationship between a tool position and a spindle position.
Figure 6:
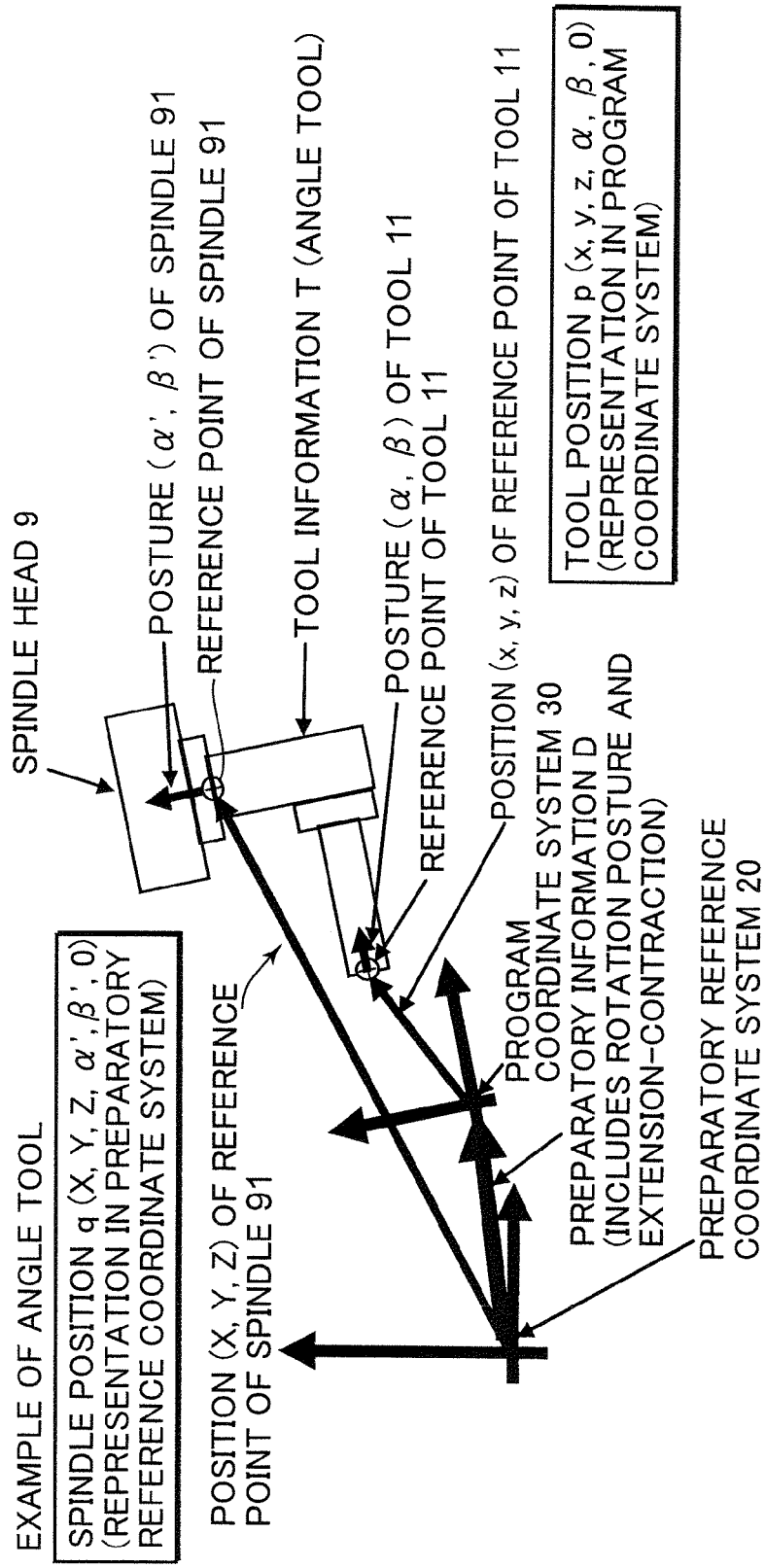
FIG. 6 is a schematic diagram showing an example of an angle tool; this figure illustrates the relationship between a tool position and a spindle position.

FIGS. 5 and 6 illustrate the relationship between a tool position and a spindle position. FIGS. 5 and 6 are schematic drawings illustrating by way of example the cases in which the tool is an end mill and an angle tool, respectively. More specifically, FIGS. 5 and 6 illustrate the relationship between a position of the tool and a position of the spindle on which the tool is mounted when the position of the tool is determined in the program coordinate system. The spindle position means a position including a posture of the spindle in the preparatory reference coordinate system 20.

A position of the tool 11 is a relative position, including the posture of the tool 11, with respect to a machining object W (see FIGS. 8 and 10) on the machine table 2. The position of the tool 11 is represented by coordinate values (x, y, z) of a reference point 111 of the tool 11 in a program coordinate system 30 that is a right-handed orthogonal coordinate system fixed to the matching object W and Euler angles ($\alpha, \beta, \gamma$) indicating the posture of the tool 11. The angles $\alpha, \beta$ indicate the inclination of the tool 11, and the angle $\gamma$ indicates the angle in the rotation direction about a central axis of the tool 11. A plurality of the program coordinate systems 30 may be provided on one machining object, but in the case explained herein only one program coordinate system is provided for the machining object W. The reference point 111 of the tool 11 generally corresponds to a tool tip positioned on the central axis of the tool 11. In the machine tools 1A to 1E, the Euler angle $\gamma$ is fixed to $\gamma=0$ and is not a control object. The position of the tool 11 will be denoted hereinbelow by $p\hat{\ }$.

The reference symbols provided with a superscript symbol "^" in the detailed description of the invention and reference symbols that are represented by using a bold font in the drawings represent vectors.

When the machining is started, the machining object W is fixedly arranged on the machine table 2, the arrangement position thereof is acquired and stored as preparatory information $D\hat{\ }$, the tool 11 is then mounted on the spindle 91, and information relating to the tool 11 is stored as tool information $T\hat{\ }$. The preparatory information $D\hat{\ }$ is stored as position information also including a rotation posture of the program coordinate system 30 with respect to the preparatory reference coordinate system 20. The tool information $T\hat{\ }$ is constituted, for example, by data including at least a tool type indicating an end mill tool or angle tool shown in FIGS. 5 and 6 and dimensions determining the tool shape.

A position $q\hat{\ }$ of the spindle 91 is represented by coordinate values (X, Y, Z) of the reference point 911 in the preparatory reference coordinate system 20 and Euler angles ($\alpha', \beta', \gamma'$) indicating the posture of the spindle 91 in the preparatory reference coordinate system 20.

Figure 7:
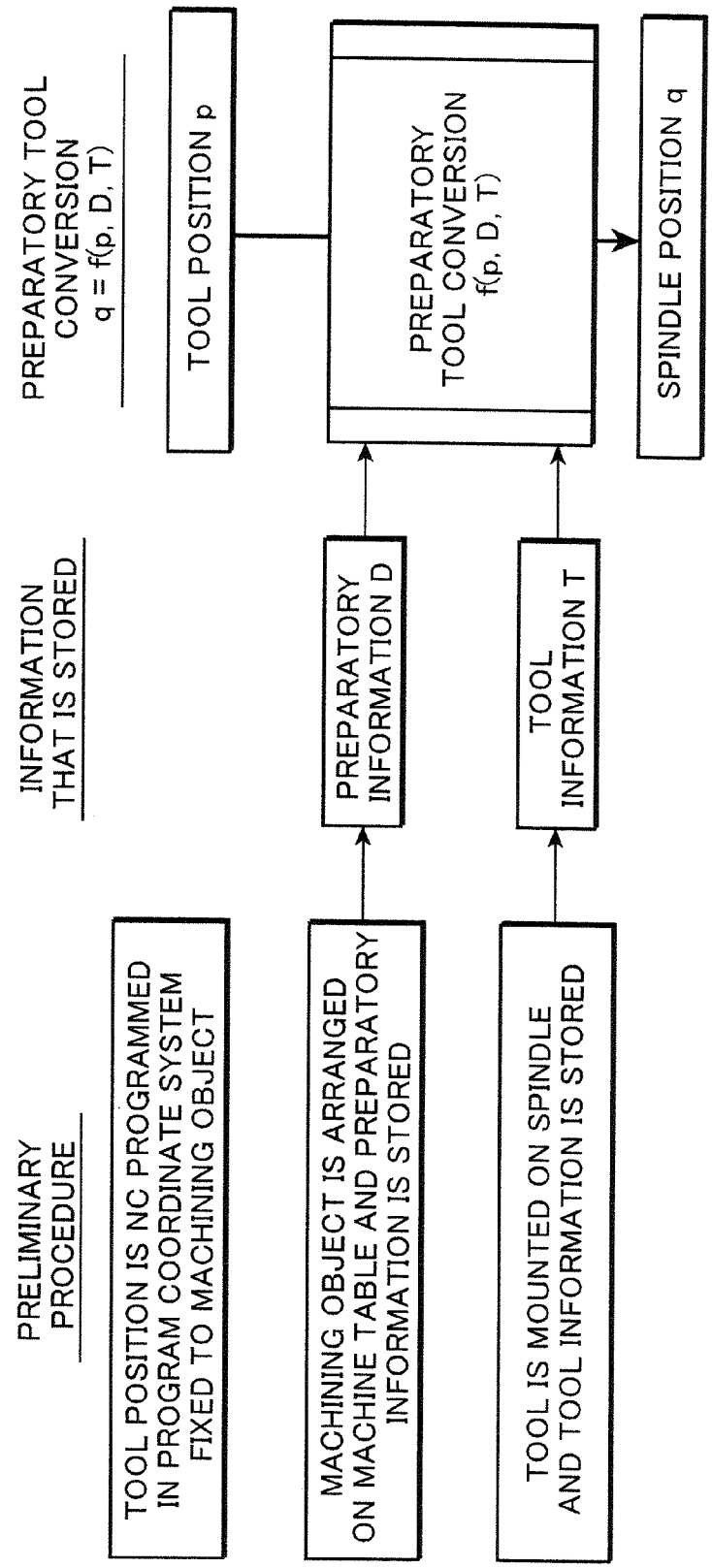
FIG. 7 is a block diagram illustrating the process of preparatory tool conversion.
Figure 8:
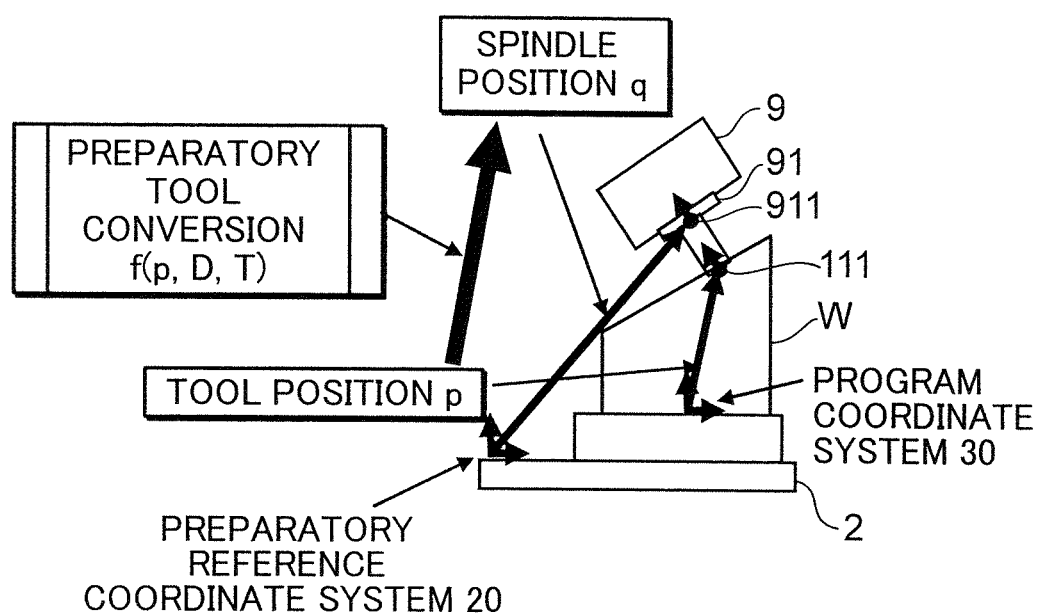
FIG. 8 is an image diagram of the preparatory tool conversion.

Thus, as shown in FIGS. 7 and 8, the correlation between the tool position $p\hat{\ }$ and the spindle position $q\hat{\ }$ is determined by the preparatory information $D\hat{\ }$ and tool information $T\hat{\ }$ and is not influenced by the machine tool structure. Here, a conversion function from the tool position $p\hat{\ }$ to the spindle position $q\hat{\ }$ is represented as a preparatory tool conversion $f\hat{\ }$ by the following Eq. (1).

$$q\hat{\ }=f\hat{\ }(p\hat{\ },D\hat{\ },T\hat{\ }) \qquad (1)$$

FIGS. 7 and 8 serve to explain the preparatory tool conversion. FIG. 7 illustrates the preparatory tool conversion process, and FIG. 8 is an image diagram of the preparatory tool conversion. According to these drawings, it is clear that the preparatory tool conversion $f\hat{\ }$ can be made common to machine tools of various kinds, regardless of the structure of the machine tools 1A to 1E.

Figure 9:
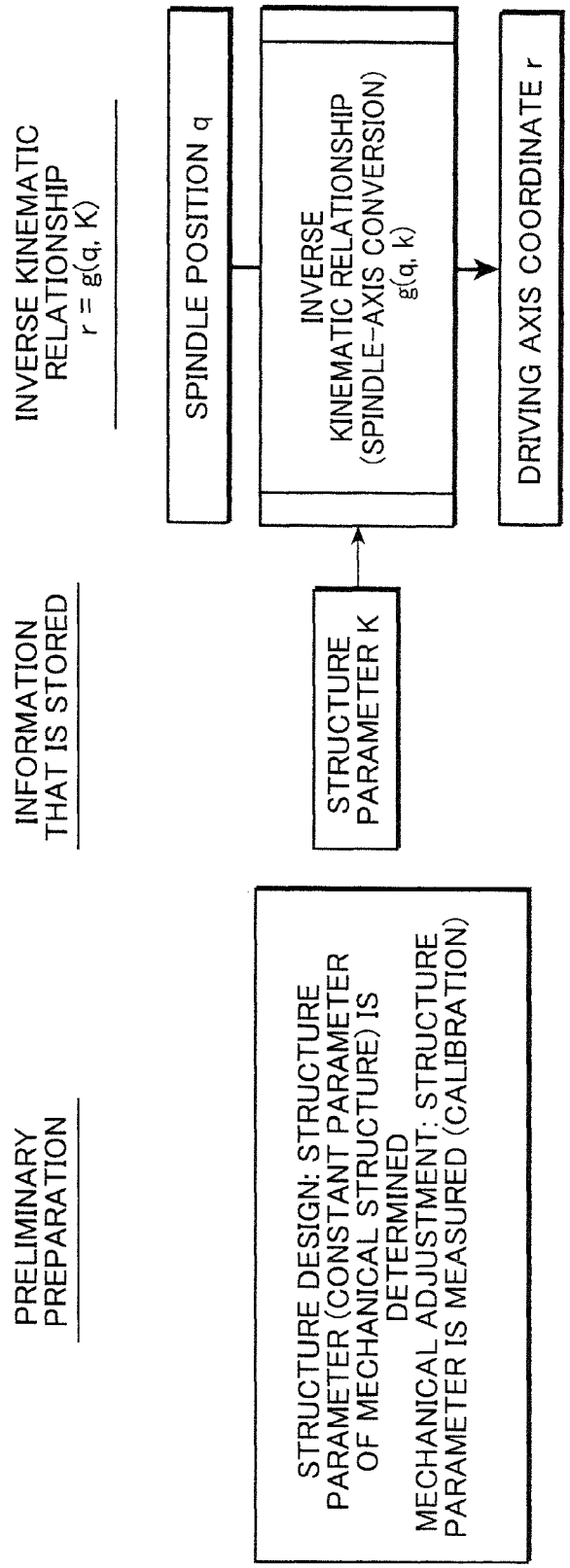
FIG. 9 is a block diagram illustrating the inverse kinematic relationship.
Figure 10:
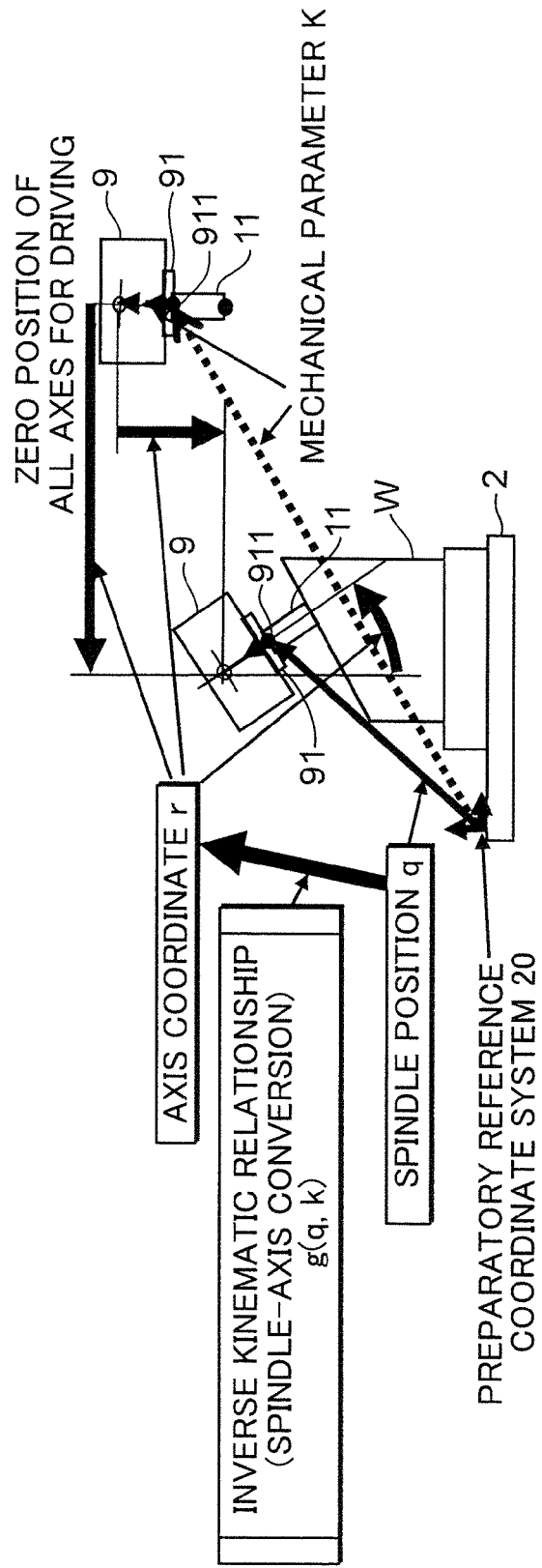
FIG. 10 is an image diagram of the inverse kinematic relationship.

Conversely, as shown in FIGS. 9 and 10, the correlation between the spindle position $q\hat{\ }$ and an axis coordinate $r\hat{\ }$ indicating the position of axes corresponding to the spindle position $q\hat{\ }$ is determined by an inverse kinematic relationship corresponding to the configuration of the axes for driving of each machine tool and a structural parameter $k\hat{}$ thereof and has no relation to the preparatory information $D\hat{}$ and the tool information $T\hat{}$. FIGS. 9 and 10 serve to explain the inverse kinematic relationship. FIG. 9 illustrates the inverse kinematic relationship. FIG. 10 is an image diagram of the inverse kinematic relationship. Here, spindle-axis conversion, which is a conversion function from the spindle position $q\hat{}$ to the axis coordinate $r\hat{}$ is represented by $g\hat{}$ and the inverse kinematic relationship is represented by the following Eq. (2).

$$r\hat{}=g\hat{}(q\hat{},k\hat{}) \quad (2)$$

In the case of the machine tool 1D, as shown in FIG. 11, for example, a condition of actuating the movement of the Z-axis and the W-axis with equal distribution may be added as a redundancy restraint condition to Eq. (2) in a redundancy restraint condition addition unit 312 (see FIG. 14), and Eq. (2) may be again stipulated as the inverse kinematic relationship such that the axis coordinate $r\hat{}$ related to the spindle position $q\hat{}$ is regulated to one coordinate.

The same is true for the machine tool 1E, as shown in FIGS. 12 and 13. The configuration of the machine tool 1E having the parallel mechanism shown in FIGS. 12 and 13 will be explained below in a simple manner. The machine tool 1E having the parallel mechanism has six joints (joining portions) 1911 to 1916 on a base 60 supported on a platform (not shown in the figure) that can move in the direction of a U-axis. A total of six struts (axes) 1921 to 1926 are connected to the respective joints 1911 to 1916. An end effector 194 is indirectly moved via joints 1931 to 1936, and the machining object W located on the machine table 2 is processed, for example machined, by independently extending or contracting the struts 1921 to 1926 on the basis of a control by a numerical control device. In other words, the end effector 194 is held on a base 60 by a parallel link mechanism constituted by the joints 1911 to 1916 located on the base 60, a plurality of struts 1921 to 1926, and joints 1931 to 1936 of the end effector 194. The tool 11 is attached to the distal end of the end effector 194. The position and posture of the tool 11 are appropriately set by controlling the extension-contraction amount of the struts 1921 to 1926.

In the present embodiment, components relating to the configuration of axis for driving in all of the machine tools 1A to 1E are included in Eq. (2), and as software relating thereto the spindle-axis conversion function $g\hat{}$ for converting the spindle position $q\hat{}$ into the dive axis coordinate $r\hat{}$ and an axis partial derivative value acquisition function for finding values obtained by first-order, second-order, and third-order partial differentiation of Eq. (2) with respect to each component of the spindle position $q\hat{}$ are created for each machine tool as functions relating to each machine tool. The created functions relating to each machine tool are recorded in the storage unit and, when necessary, these functions are invoked, thereby making the entire software, except for the functions, common to the machine tools 1A to 1E. The configuration of the numerical control device and the numerical control process of the present embodiment will be explained below.

Figure 14:
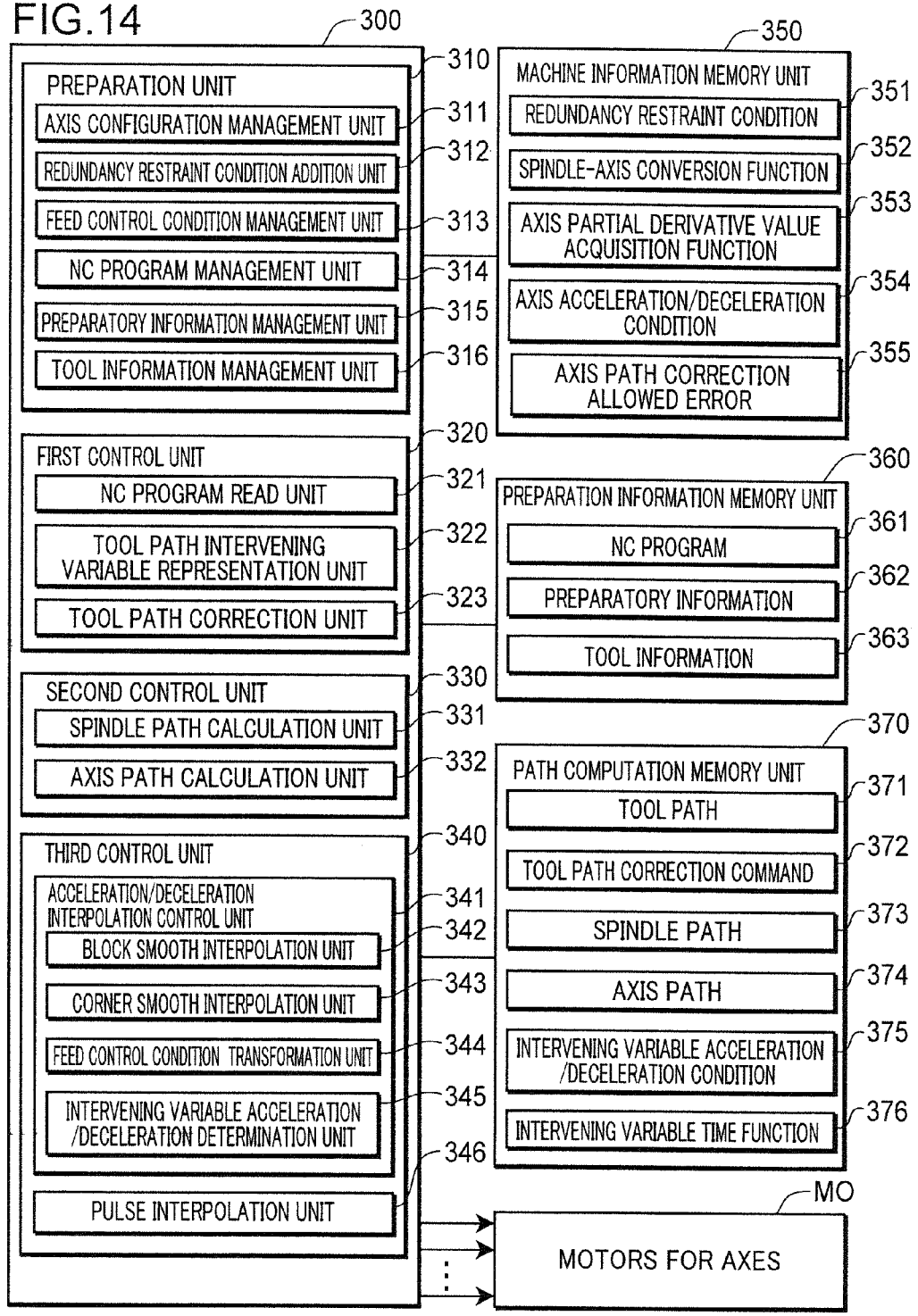
FIG. 14 is a block diagram illustrating an embodiment of the numerical control device used in accordance with the present invention.

FIG. 14 is a block diagram illustrating an embodiment of a numerical control device used in accordance with the present invention. A numerical control device 300 is constituted, for example, by a microcomputer, provided with a preparation unit 310, a first control unit 320, a second control unit 330, and a third control unit 340, and connected to a machine information memory unit 350, a preparation information memory unit 360, and a path computation memory unit 370. The preparation unit 310 has an axis configuration management unit 311, a redundancy restraint condition addition unit 312, a feed control condition management unit 313, a NC program management unit 314, a preparatory information management unit 315, and a tool information management unit 316. The first control unit 320 has a NC program read unit 321, a tool path intervening variable representation unit 322, and a tool path correction unit 323. The second control unit 330 has a spindle path calculation unit 331 and an axis path calculation unit 332. The third control unit 340 has an acceleration/deceleration interpolation control unit 341 and a pulse interpolation unit 346. The acceleration/deceleration interpolation control unit 341 has a block smooth interpolation unit 342, a corner smooth interpolation unit 343, a feed control condition transformation unit 344, and an intervening variable acceleration/deceleration determination unit 345.

Figure 15:
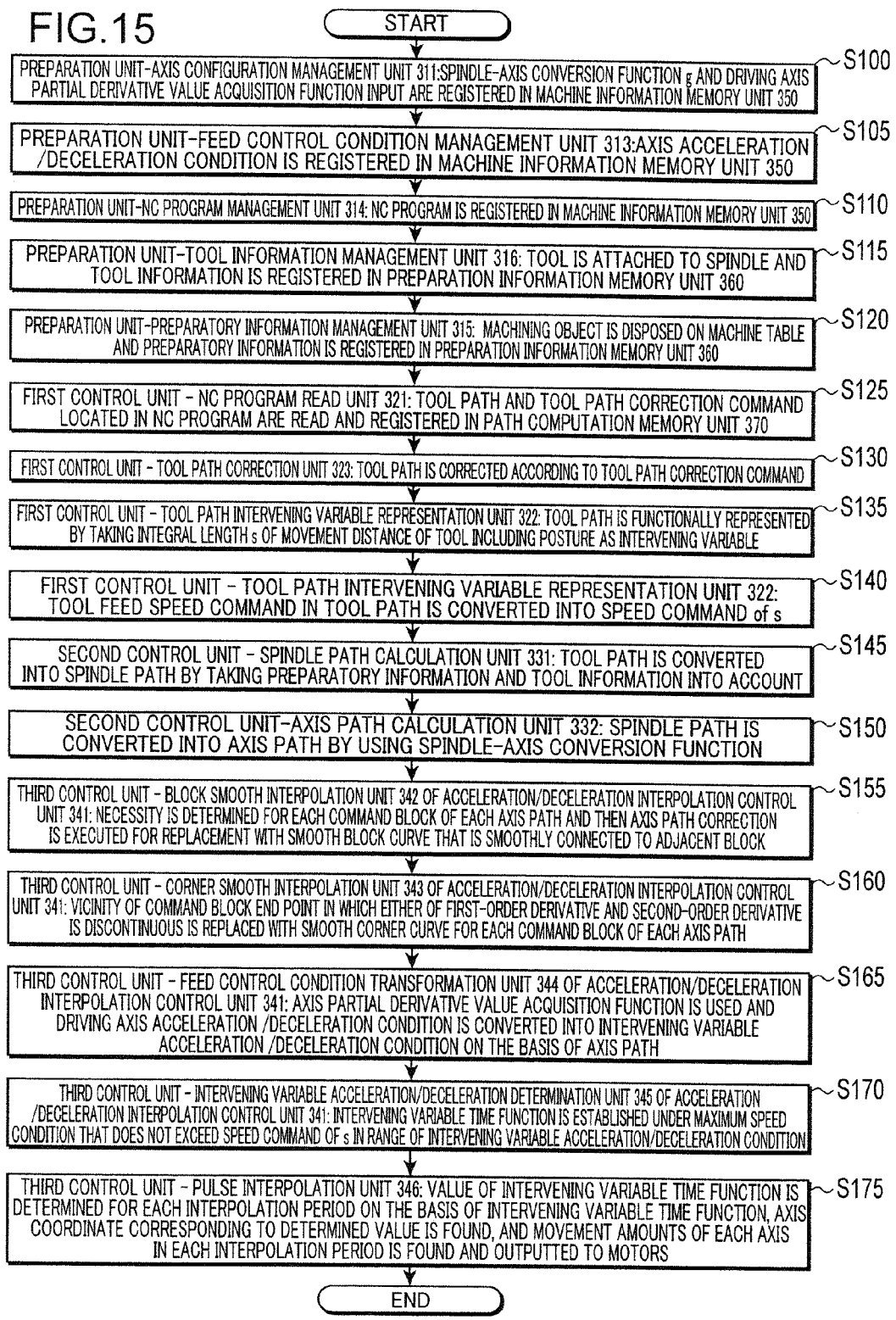
FIG. 15 is a flowchart illustrating an embodiment of a flow of the numerical control process.

FIG. 15 is a flowchart illustrating an embodiment of a flow of the numerical control process. The flow of the numerical control process of the present embodiment will be explained below with reference to FIG. 10. In the actual numerical control process, a cyclic processing is performed by which when the volume of a NC program is large, about half of the NC program is read out according to the capacity of the memory unit and stored temporarily in a RAM (not shown in the figure), and after the first half of the NC program that has been read out is processed, the remaining portion of the NC program is successively read, but the explanation of the repeating portions will herein be omitted to simplify the explanation.

In the numerical control process of the present embodiment, the preparation unit 310 functions in steps S100 to S120. In step S100, the axis configuration management unit 311 receives an input of the spindle-axis conversion function $g\hat{}$ and axis partial derivative value acquisition function created on the basis of the inverse kinematic relationship, registers these functions in the machine information memory unit 350, and effectuates the use of the spindle-axis conversion function $g\hat{}$ and axis partial derivative value acquisition function corresponding to the respective machine tool. In step S105, the feed control condition management unit 313 registers axis acceleration/deceleration conditions including the maximum allowed speed, maximum allowed acceleration, and maximum allowed jerk of each axis for driving in the machine information memory unit 350. In step S110, the NC program management unit 314 receives the input of a NC program including a tool path composed of a tool position trajectory and a tool feed speed command and a tool path correction command, which is a command for correcting the tool path, and registers the NC program in the machine information memory unit 360. In step S115, the tool information management unit 316 receives an input of tool information $T\hat{}$ of the tool 11 attached to the spindle 91 and registers the tool information $T\hat{}$ in the preparation information memory unit 360. In step S120, the preparatory information management unit 315 receives an input of preparatory information $D\hat{}$ of the machining object arranged on the machine table 2 and registers the preparatory information $D\hat{}$ in the preparation information memory unit 360.

Figure 16:
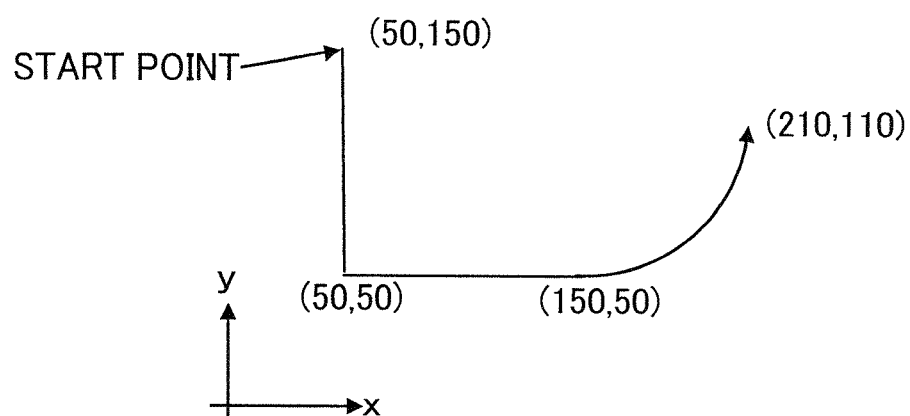
FIG. 16 illustrates an example of a tool path p^(s).

Then, the first control unit 320 functions in steps S125 to 140. In step S125, the NC program read unit 321 reads the NC program 361 registered in the preparation information memory unit 360, extracts the tool path and tool path correction command described in the NC program 361, and registers the extracted tool path and tool path correction command in the path computation memory unit 370. In step S130, the tool path correction unit 323 corrects the tool path according to the tool path correction command. In step S135, the tool path intervening variable representation unit 322 converts the tool path $p\hat{}$ into functional representation in which a tool path integral length s, which is a movement distance along the trajectory of the tool path p^, is an intervening variable. The tool path converted into the functional representation will be hereinbelow represented by p^(s). FIG. 16 shows an example of the tool path p^(s). For example, when the tool path passes, as shown in FIG. 16, from the start point (50, 150) through (50, 50), (150, 50), (210, 110), p^(s) becomes:

$$p^{\wedge}(s) = \begin{cases} (50, 150-s) & (0 <= s <= 100) \\ (s-50, 50) & (100 < s <= 200) \\ \begin{pmatrix} 150 + 60\sin((s-200)/60), \\ 110 - 60\cos((s-200)/60) \end{pmatrix} & (200 < s <= 200 + 30\pi) \end{cases}$$

Further, in step S140, the tool path intervening variable representation unit 322 converts the feed speed command included in the tool path into a feed speed command of tool path integral length s.

With the conventional technique, CL (cutter location) data, that is, tool path data, are created by CAM and these CL data are converted into a NC (numerical control) program conforming to each machine tool in a post processor that has received the data from CAM, but in the present embodiment, the conventional post processor is made unnecessary by providing the NC program read unit 321 receiving the CL data outputted by CAM as a NC program.

Then, the second control unit 330 functions in steps S145 to 150. First, in step S145, the spindle path calculation unit 331 converts the tool path p^(s) registered in the path computation memory unit 370 into the spindle path q^(s), which is a functional representation of the trajectory of the spindle position with the tool path integral length s serving as an intervening variable, by using preparatory tool conversion f^ based on the preparatory information D^ and tool information T^. A feed speed command of the tool path integral length s can be directly used as a feed speed command of the spindle path q^(s). Thus, Eq. (1) is represented by the following Eq. (3).

$$q^{\wedge}(s) = f^{\wedge}(p^{\wedge}(s), D^{\wedge}, T^{\wedge}) \quad (3)$$

In step S150, the axis path calculation unit 332 determines the axis path r^(s), which is the trajectory of axis coordinates, from the spindle path q^(s) by using the spindle-axis conversion function g^. A feed speed command of the tool path integral length s can be directly used as a feed speed command of the axis path r^(s). Thus, Eq. (2) is represented by the following Eq. (4).

$$r(s) = q(q(s), k) \quad (4)$$

Figure 17:
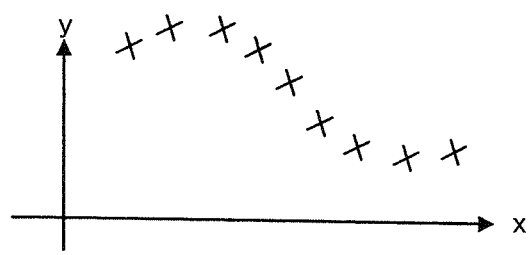
FIG. 17 illustrates command values for each command block of y-axis with respect to x-axis.
Figure 18:
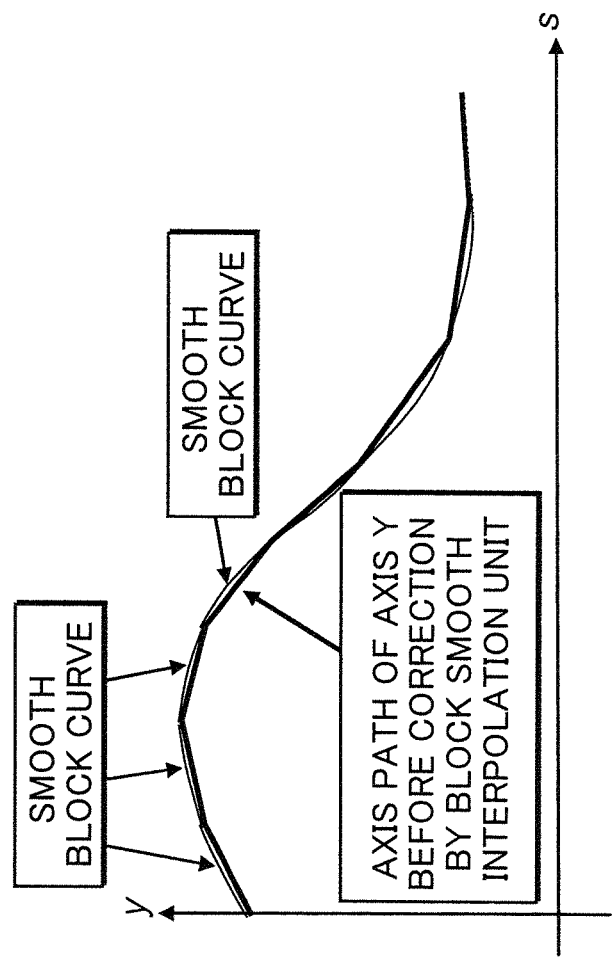
FIG. 18 illustrates a smooth block curve interpolated in the y-axis.
Figure 19:
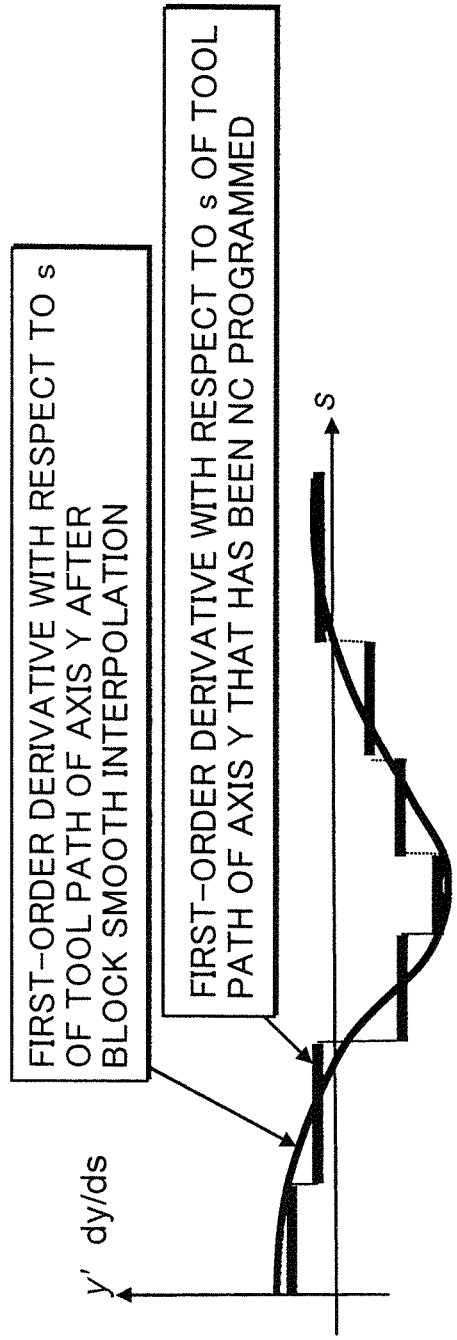
FIG. 19 shows a first-order derivative with respect to the tool path integral length s of the smooth block curve interpolated in the y-axis.
Figure 20:
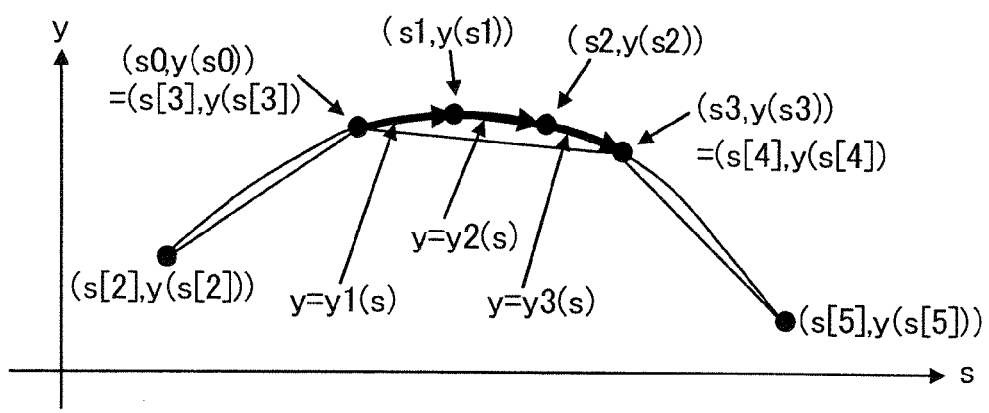
FIG. 20 shows a curve obtained by connecting third-order polynomial curves of the tool path integral length s so that the first-order derivative and a second-order derivative with respect to the tool path integral length s change continuously in the connection points, the obtained curve serving as a smooth block curve that causes the first-order derivative and a second-order derivative with respect to the tool path integral length s to change continuously from the adjacent block in both a start point and an end point.

The third control unit 340 then functions in steps S155 to 175. First, in step S155, the block smooth interpolation unit 342 determines whether or not start points or end points, or both the start points and the end points of command blocks should be connected so that the first-order derivative value and second-order derivative value obtained with respect to the tool path integral length s change continuously, this determination being performed for each command block of a length preset with respect to an axis path of each axis for driving. When the connection is determined to be necessary, the first-order derivative value and second-order derivative value obtained with respect to the tool path integral length s in at least either of the start point and end point for continuous change from the adjacent block are determined and then the correction of the axis path is performed by which the axis path is changed into a smooth block curve corresponding to an interpolation curve matching the first-order derivative value and second-order derivative value. FIGS. 17 to 19 show image diagrams of the axis path after correction in the Y-axis in the machine tools 1A to 1D. Further, in the present embodiment, as shown in FIG. 20, a curve obtained by connecting three third-order polynomial curves of the tool path integral length s so that the first-order derivative value and a second-order derivative value obtained with respect to the tool path integral length s change continuously in the connection points serves as a smooth block curve that causes the first-order derivative value and second-order derivative value obtained with respect to the tool path integral length s to change continuously from the adjacent blocks in both a start point and an end point.

FIG. 17 illustrates command values for each command block of a y-axis with respect to a x-axis. FIG. 18 illustrates an interpolated smooth block curve in the y-axis. FIG. 19 shows a first-order derivative with respect to the tool path integral length s of the interpolated smooth block curve in the y-axis. FIG. 20 shows a curve obtained by connecting third-order polynomial curves of the tool path integral length s so that the first-order derivative value and a second-order derivative value with respect to the tool path integral length s change continuously in the connection points, the obtained curve serving as a smooth block curve that causes the first-order derivative value and a second-order derivative value with respect to the tool path integral length s to change continuously from the adjacent block in both a start point and an end point. The curve interpolation conditions in FIG. 20 are as follows: the curve passes through each command point and the curve before and after each command point is continuous in the first-order derivative value and second-order derivative value. For example, the command values are assumed to be s0=s[3], s3=s[4], s1=(2·s0+s3)/3, s2=(s0+2·s3)/3, the interpolation between (s[3], Y(s[3])) and (s[4], Y(s[4])) is performed by taking Y(s0), Y'(s0), Y''(s0), Y(s3), Y'(s3), Y''(s3) as restraint conditions, and a spatial curve in which the first-order derivative value and second-order derivative value are continuous between (s0, Y(s0)), (s3, Y(s3)) satisfying these conditions is generated as three third-order polynomial curves. Thus, the found third-order polynomial curves are $$y1(s) = a0 \cdot s^3 + a1 \cdot s^2 + a2 \cdot s + a3 \quad (s0 <= s <= s1)$$

$$y2(s) = b0 \cdot s^3 + b1 \cdot s^2 + b2 \cdot s + b3 \quad (s1 <= s <= s2)$$

$$y3(s) = c0 \cdot s^3 + c1 \cdot s^2 + c2 \cdot s + c3 \quad (s2 <= s <= s3)$$

and the following series of equations is obtained by substituting the restraint conditions.

$$y1(s0) = y(s0); \quad y1'(s0) = y'(s0); \quad y1''(s0) = y''(s0);$$

$$y3(s3) = y(s3); \quad y3'(s3) = y'(s3); \quad y3''(s3) = y''(s3);$$

$$y1(s1) = y2(s1); \quad y1'(s1) = y2'(s1); \quad y1''(s1) = y2''(s1);$$

$$y3(s2) = y2(s2); \quad y3'(s2) = y2'(s2); \quad y3''(s2) = y2''(s2);$$

It can be seen that Y=Y1(s), Y=Y2(s), Y=Y3(s) can be obtained by solving this series of equations by taking four of each of three third-order spline coefficients for a total of 12 coefficients as unknown values.

Then, in step S160, the corner smooth interpolation unit 343 determines whether or not either of the first-order derivative value and second-order derivative value with respect to the tool path integral length s matches the corresponding derivative value in the start point of the subsequent command block after the interpolation has been performed by the block smooth interpolation unit 342 in the end point of each command block of the axis path. When the corner smooth interpolation unit 343 determines that either the first-order derivative value or the second-order derivative value does not match the corresponding derivative value in the start point of the subsequent command block, the axis path is corrected by changing the axis path into a smooth corner curve for each axis. The smooth corner curve is a curve that has the first-order derivative value and second-order derivative value equal to the first-order derivative value and second-order derivative value of the present command block for which matching of the derivative values has been checked, comes into contact with the present command block, has the first-order derivative value and second-order derivative value equal to the first-order derivative value and second-order derivative value of the subsequent command block, comes into contact with the subsequent command block, and has a distance to the end point of the present command block equal to or less than the axis path correction allowed error. The correction of the axis path performed for each axis for driving replaces the axis path between a contact point of the smooth corner curve with the present command block and a contact point of the smooth corner curve with the subsequent command block with the smooth corner curve. FIGS. 21 to 24 show the images of the smooth corner curves. In the present embodiment, as shown in FIG. 25 a curve obtained by connecting three third-order polynomial curves of the tool path integral length s so that the first-order derivative value and second-order derivative value obtained with respect to the tool path integral length s change continuously in the connection points thereof is used for each axis for driving as the smooth corner curve.

Figure 21:
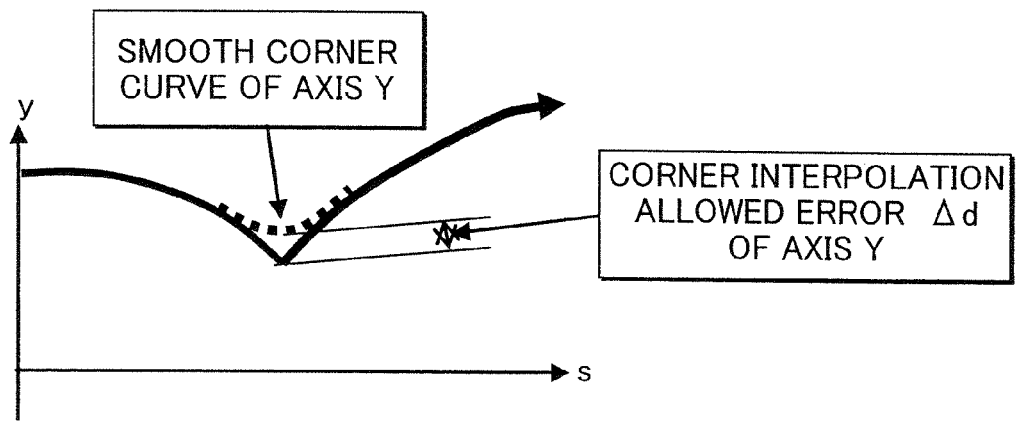
FIG. 21 is an image diagram of a smooth corner curve obtained by smooth interpolation performed to show a discontinuity point by a broken line.
Figure 22:
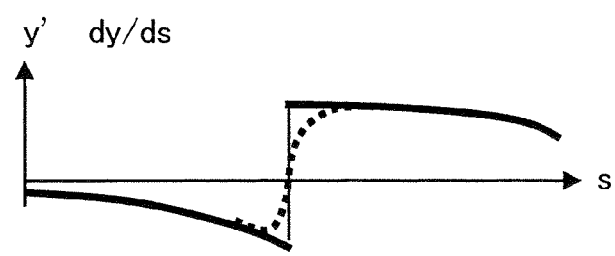
FIG. 22 is an image diagram of a smooth corner curve; the diagram shows a first-order derivative (broken line).
Figure 23:
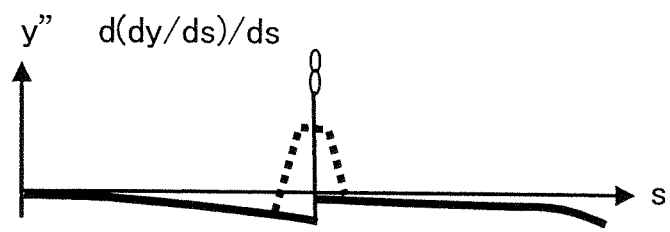
FIG. 23 is an image diagram of a smooth corner curve; the diagram shows a second-order derivative (broken line).
Figure 24:
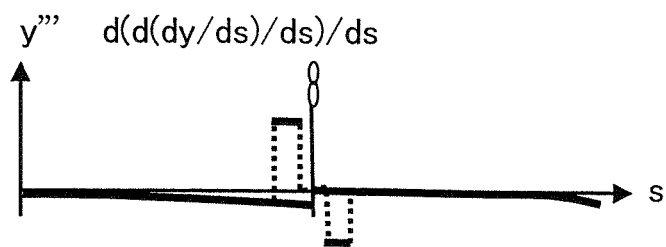
FIG. 24 is an image diagram of a smooth corner curve; the diagram shows a third-order derivative (broken line).
Figure 25:
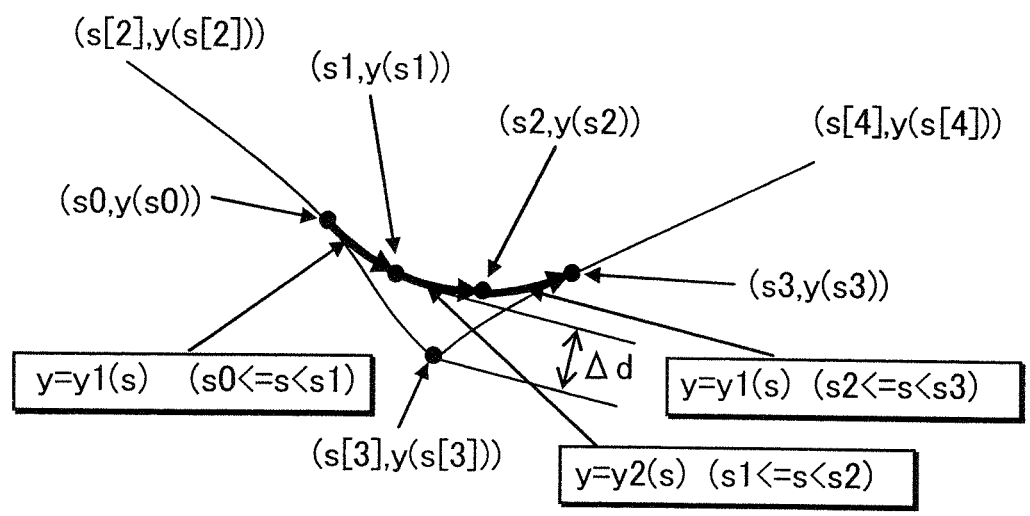
FIG. 25 shows a curve obtained by connecting three third-order polynomial curves of tool path integral length s so that the first-order derivative and a second-order derivative with respect to the tool path integral length s change continuously in the connection points.

FIGS. 21 to 24 show images of smooth corner curves. FIG. 21 shows an image obtained by providing smooth interpolation such as shown by a broken line to discontinuity point. FIG. 22 illustrates first-order differentiation (broken line). FIG. 23 illustrates second-order differentiation (broken line). FIG. 24 illustrates third-order differentiation (broken line). In FIG. 21, Δd is a corner interpolation allowed error, and the smooth interpolation curve is found such that the corner interpolation allowed error Δd is within the preset range. FIG. 25 shows a smooth corner curve obtained by connecting three third-order polynomial curves of the tool path integral length s so that the first-order derivative value and second-order derivative value obtained with respect to the tool path integral length s change continuously in the connection points thereof. In FIG. 25, the following equations are valid with respect to the discontinuous point (s[3], Y(s[3])).

$$y(s0)=y1(s0); y'(s0)=y1'(s0); y''(s0)=y1''(s0);$$

$$y1(s1)=y2(s1); y1'(s1)=y2'(s1); y1''(s1)=y2''(s1);$$

$$y2(s2)=y3(s2); y2'(s2)=y3'(s2); y2''(s)=y3''(s2);$$

$$y3(s3)=y(s3); y3'(s3)=y'(s3); y3''(s3)=y''(s3);$$

Here, s0, s1, s2, s3 are values of s in each contact point and may be determined from a shape of Y=Y(s) before and after a corner and from an allowed error ε. For example, $$s0=s[3]-3\epsilon; s3=s[3]=3\epsilon;$$

$$s1=s[3]-\epsilon; s2=s[3]=\epsilon;$$

Then, in step S165, the feed control condition transformation unit 344 derives an intervening variable acceleration/deceleration condition from the spindle path q^(s) and the axis acceleration/deceleration condition 354 that has been stored in the machine information memory unit 350 on the basis of the axis path r^(s). The intervening variable acceleration/deceleration condition is a control condition of the tool path integral length s that should be satisfied when the drive about each axis for driving are performed and also a condition that should be satisfied by a first-order derivative s', second order derivative s'', and third-order derivative s''' of the tool path integral length s with respect to time for each value of the tool path integral length s. For the purpose of explanation, the axis coordinates r^(s), spindle position q^(s), and inverse kinematic conversion function g^(q^(s), k^) are represented by the following arrangement.

r[i](i=0, 1, 2, ..., n)
g[i](i=0, 1, 2, ..., n)
q[j](j=0, 1, 2, 3, 4)

Here, n is the number of axes for driving. r[i], g[i], q[i] are component representation of r^(s), q^(s), g^(q^, k^), respectively.

By using these components, Eq. (4) above can be represented by the following Eq. (5).

$$r[i]=g[i](q[0],q[1],q[2],q[3],q[4]) \qquad (5)$$

On the basis of Eq. (5), the first-order, second-order, and third-order derivatives of r[i] with respect to time t, that is, speed, acceleration, and jerk of each axis for driving, can be expanded as shown by Eqs. (6) to (11). The following abbreviated symbols are used to improve the readability of the representation.

r'[i] denotes dr[i]/ds,
r''[i] denotes d(dr[i]/ds)/ds,
r'''[i] denotes d(d(dr[i]/ds)/ds)/ds,
q'[j] denotes dq[j]/ds,
q''[j] denotes d(dq[j]/ds)/ds,
q'''[j] denotes d(d(dq[j]/ds)/ds)/ds,
s' denotes ds/dt,
s'' denotes d(ds/dt)/dt,
s''' denotes d(ds/dt)/dt)/dt,
δgij denotes ∂g[i]/∂q[j],
δgijk denotes ∂(∂g[i]/∂q[j])/∂q[k],
δgijkm denotes ∂(∂(∂g[i]/∂q[j])/∂q[k])/∂q[m],
with respect to f[j], Σj denotes Σj(f[j])=Σ(f[j])(j=0, 1, 2, 3, 4)=f[0]+f[1]+f[2]+f[3]+f[4].

$$r'[j] = \Sigma j(\delta gij * q'[j]) \qquad (6)$$

$$r''[i] = \Sigma j(d(\delta gij)/ds * q[j] + \delta gij * q''[j]) \qquad (7)$$
$$= \Sigma j((\Sigma k(\delta gijk * q'[k])) * q'[j] + \delta gij * q''[j])$$

$$r'''[i] = d(\Sigma j(\Sigma k(\delta gijk * q'[k]) * q'[j] + \delta gij * q''[j])/ds \qquad (8)$$
$$= \Sigma j(\Sigma k(d(\delta gijk * q'[k])/ds) * q'[j]) +$$
$$\Sigma j(\Sigma k(\delta gijk * q'[k]) * q''[j]) +$$
$$\Sigma j(d(\delta gij)/ds * q''[j]) + \Sigma j(\delta gij * q'''[j])$$
$$= \Sigma j(\Sigma k(\Sigma m(\delta gijkm * q'[m]) * q'[k]) * q'[j]) +$$
$$\Sigma j(\Sigma k(\delta gijk * q''[k]) * q'[j]) +$$
$$\Sigma j(\Sigma k(\delta gijk * q'[k]) * q''[j]) +$$
$$\Sigma j(\Sigma k(\delta gijk * q'[k]) * q''[j]) +$$
$$\Sigma j((\delta gij * q'''[j])$$
$$= \Sigma j(\Sigma k(\Sigma m(\delta gijkm * q'[m]) * q'[k]) * q'[j]) +$$
$$3\Sigma j(\Sigma k(\delta gijk * q''[k]) * q'[j]) +$$
$$\Sigma j((\delta gij * q'''[j])$$

$$dr[i]/dt = r'[i] * s' \qquad (9)$$

$$d(dr[i]/dt)/dt = r''[i] * s' * s' + r'[i] + s'' \qquad (10)$$

$$d(dr[i]/dt)/dt)/dt = r'''[i] * s' * s' * s' + 3 * r''[i] * s' * s'' + r'[i] * s''' \qquad (11)$$

The axis acceleration/deceleration condition stipulates maximum allowed values of speed in Eq. (9), acceleration in Eq. (10), and jerk in Eq. (11). q[j], q'[j], q''[j], q'''[j] in each value of the tool path integral length s are determined by the spindle path. Further, δgij, δgijk, δgijkm contained in the above-described relationships may be found by using an axis coordinate partial derivative value acquisition function. Thus, r'[i], r"[i], r'"[i] in each value of the tool path integral length s are found from Eq. (6), Eq. (7), Eq. (8), and the following Eq. (12) is obtained as an intervening variable acceleration/deceleration condition under a condition that the maximum allowed values MAXv[i], MAXa[i], MAXj[i] of the speed of Eq. (9), acceleration of Eq. (10), and jerk of Eq. (11) stipulated by the axis acceleration/deceleration condition are not exceeded. The intervening variable acceleration/deceleration condition is a condition according to which the first-order derivative s', second order derivative, s", and third-order derivative s'" of the tool path integral length s with respect to time for each value of the tool path integral length s should satisfy the following relationships.

$$\left.\begin{array}{l} r'[i]*s' < = \text{MAX}v[i] \\ r''[i]*s'*s' + r'[i]*s'' <= \text{MAX}a[i] \\ r'''[i]*s'*s'*s' + 3*r''[i]*s'*s'' + r'[i]*s''' <= \text{MAX}j[i] \end{array}\right\} \quad (12)$$

In step S170, the intervening variable acceleration/deceleration determination unit 345 establishes an intervening variable time function s(t) in which the tool path integral length s is a function of time t on the basis of the intervening variable acceleration/deceleration condition and feed speed command of the tool path integral length s.

In step S175, the pulse interpolation unit 346 finds a value of the intervening variable time function s(t) for each interpolation period and a value of the axis coordinate r^(s) on the basis of the intervening variable time function s(t), finds the movement amounts of each axis coordinate in each interpolation period, and outputs the movement amount to motors MO, which are drive sources.

The following embodiments of the present invention can be also employed.

(1) In the above-described embodiment, the tool posture in a tool position is indicated by Euler angles ($\alpha$, $\beta$, 0), but it may be instead indicated by a tool axis vector. Alternatively, the tool posture may be indicated by the angle of the rotating axes of each machine tool.

(2) In the above-described embodiment, the axis rotating about the axial center of the tool is not a control object, but the axis rotating about the axial center of the tool can also be a control object. In this case, an E-axis rotating about the axial center of the tool is added. The posture of the tool position p is indicated by ($\alpha$, $\beta$, $\gamma$), and the posture of the spindle position is also managed by ($\alpha'$, $\beta'$, $\gamma'$). Here, $\gamma$ is not always clearly indicated. For example, a function, of automatically implementing the correction of a tool path to obtain a direction perpendicular to the advance direction of the tool path may be included. This function can be commonly used in the machine tools 1A to 1E, as long as an axis rotating about the axial center of the tool is added.

(3) In the machine tool 1D, the movement of the cross rail 5 along the W-axis in the machine tool 1D consumes a large amount of energy because the heavy cross rail 5 is moved up and down. By contrast, the movement of a ram (head member 6) carrying the spindle head 9 up and down along the Z-axis consumes little energy. However, where the ram is lowered too much along the Z-axis, the distance from the holding portion of the ram to the spindle head 9 increases and therefore the rigidity decreases. As a result, vibrations can occur in heavy cutting. Therefore, the drawback of such configuration is that application thereof to heavy cutting is difficult. In other words, it is preferred that in heavy cutting, the ram be drawn back along the Z-axis as much as possible and the distance from the holding portion of the ram to the spindle head 9 be reduced, and that in light cutting, the movement of the ram along the Z axis that consumes little energy be used. Further, high-rigidity machining and echo machining can be freely realized by preparing a command allowing the selection of either the high-rigidity machining or echo (light) machining as a redundancy restraint condition switching command of the NC program in the redundancy restraint condition addition unit 312, reading the redundancy restraint condition switching command in the NC program read unit 321, using a condition of "drawing out the ram along the Z axis as much as possible" as the redundancy restraint condition when the "high-rigidity machining" is instructed, and using a condition of "using the movement along the Z-axis, without using the movement along the W axis, if only possible" as the redundancy restraint condition when the "echo machining" is instructed.

(4) The tool position indicated in the NC program is described by coordinate values (X, Y, Z) of the tip 111 of the tool 11 and ($\alpha$, $\beta$, $\gamma$) representing the posture of the tool 11. Among them, a tool axis vector may be used for ($\alpha$, $\beta$). To accommodate the users that would like to use, without changes, a NC program for a machine tool that has already been similarly used, it is possible to read a NC program of a specific format in the NC program read unit 321, perform conversion to the tool path, and register the converted tool path in the path computation memory unit 370, thereby implementing an embodiment in which an already installed conventional NC program for machine tools can be used as is.

(5) In the above-described embodiment, the conditions of feed speed control for each axis are restricted to the maximum allowed speed, maximum allowed acceleration, and maximum allowed jerk, and the feed speed acceleration/deceleration unit that ensures continuous changes of a first-order derivative and a second-order derivative by referring to first-order, second-order, and third-order derivatives of the s with respect to time in determination of feed speed is explained. The present invention does not negate the control of even higher order and, for example, a road to realizing a feed speed control in a larger number of dimensions can be opened by targeting derivatives of an order up to n and ensuring continuous variations of speed, acceleration, jerk, jerk variation rate, ... (n−1)-th derivative obtained by differentiating all the positions about axes for driving with respect to time. Further, an acceleration/deceleration control that absorbs inertia within a very short time interval can be realized.

SUMMARY OF EMBODIMENT

The above-described embodiment is summarized below.

Thus, the numerical control device according to the above-described embodiment controls a machine tool having at least a spindle for mounting a tool, a spindle head that fixedly holds the spindle, a machine table on which a machining object is fixedly disposed, the relative positional relationship between the spindle head and the machine table including a rotation posture being controlled about a plurality of axes for driving, and motors adapted for drive about each of axes, with a preparatory reference coordinate system, in which orientations of coordinate axes and a position of an original point are fixed, being set on the machine table, the numerical control device having a preparation unit, a first control unit, a second control unit, and a third control unit; wherein the preparation unit has at least an NC program management unit, a preparatory information management unit, and a tool information management unit as segmentalized sub-means; the NC program management unit stores in a preparation information memory unit a NC program having described therein a trajectory of a tool position, which is a position including a tool posture in a program coordinate system fixed to the machining object, a tool path formed of a tool feed speed command indicating a feed speed thereof, and an as-needed tool path correction command; the preparatory information management unit stores in the preparation information memory unit preparatory information, which is information on a position that is in the preparatory reference coordinate system and composed of original point coordinate in the program coordinate system and posture angles indicating orientations of coordinate axis cosines, as an arrangement position including a posture of the machining object to the machine table; the tool information management unit stores in the preparation information memory unit tool information including a shape of the tool used, a length of the tool, and dimensional information on a correction amount of a tool radius; the first control unit has as segmentalized sub-means an NC program read unit and a tool path correction unit; the NC program read unit reads the tool path and the tool path correction command described in the NC program and stores the tool path and the tool path correction command in a path computation memory unit; the tool path correction unit corrects the tool path according to the tool path correction command; the second control unit finds an axis path corresponding to a trajectory of axis coordinates, which are position coordinates about all axes for driving, from the tool path on the basis of the preparatory information and the tool information by taking into account specific features of configuration of the axes for driving, and stores the found axis path in the path computation memory unit; the third control unit finds a movement amount about each axis for driving for each interpolation period from the axis path and outputs the found movement amounts to the motors; the preparation unit further has an axis configuration management unit as segmentalized sub-means; the axis configuration management unit stores in a machine information memory unit a spindle-axis conversion function that converts into the axis coordinates the spindle position based on an inverse kinematic relationship that is determined by the configuration of the axes for driving, the relationship indicating a correlation between the axis coordinates and a spindle position, which is position information obtained by representing a position of the spindle, including the rotation posture thereof, in the preparatory reference coordinate system; the second control unit has a spindle path calculation unit and an axis path calculation unit as segmentalized sub-means; the spindle path calculation unit converts the tool path into a spindle path, which is a trajectory of the spindle position, on the basis of the preparatory information and the tool information, irrespectively of the configuration of the axes for driving, and stores the spindle path in the path computation memory unit; and the axis path calculation unit converts the spindle path into the axis path by using the spindle-axis conversion function, and stores the axis path in the path computation memory unit.

In such numerical control device, a portion influenced by the configuration of axes for driving is only the inverse kinematic relationship, which is a correlation between the axis coordinates and the reference position of the spindle on which the tool is mounted, and this portions influenced by the configuration of axes for driving is completely cut off from the conversion relating to the arrangement position of the work or shape and dimensions of the tool. As a result, all of the functions relating to the tool path, such as tool path correction, e.g. tool diameter correction before the spindle position is determined, coordinate conversion corresponding to the shape and dimensions of the tool, and coordinate conversion corresponding to the arrangement position including the posture of the work, can be made common to all of the machine tools. Tool length correction and preparatory error correction are typically also included into the portion common to all of the machine tools. Further, the method of use is not only common, but by creating a function relating to the inverse kinematic relationship for each configuration of axis for driving, it is possible to adapt all other control processes to a machine tool of any structure by using absolutely identical software. Thus, all the functions, except the function relating to the inverse kinematic relationship, may be created once, regardless of the machine tool structure. As a result, it is not necessary to create similar but still different functions on each occasion and therefore wasted effort can be avoided. As for the machine tools of novel structures, it will suffice to create an inverse kinematic function and functions relating thereto, and the above-described software can be used as is, provided that physical conditions such as the number of axes, movable area, and mutual interference are not the factors.

The above-described numerical control device preferably has a configuration in which the preparation unit further has a redundancy restraint condition addition unit as a segmentalized sub-unit; the redundancy restraint condition addition unit stores in the path computation memory unit a redundancy restraint condition, which is an additional condition that, when this condition is added to the inverse kinematic function, can regulate to one the number of axis coordinates corresponding to the spindle position in the case in which the machine tool has an axis configuration having a redundancy such that when the axis coordinates corresponding to the spindle position are found on the basis of the inverse kinematic relationship, an infinite number of solutions is obtained, and the spindle-axis conversion function is a function for calculating the one axis coordinate corresponding to the spindle position by using together the inverse kinematic function and the redundancy restraint condition stored in the path computation memory unit.

With such a configuration, for example, even in a machine tool with an axis configuration having a redundancy of having a plurality of parallel axes for driving, it is suffice to add one condition to the inverse kinematic relationship, and everything else is common and all the functions can be used without any change. Further, in this configuration, a numerical control can be provided in which continuous simultaneous control can be used together with other functions such as tool diameter correction and circular arc interpolation. Further, with such a configuration, even in machining in which the movable area is expanded by adding a parallel axis, it is possible to perform high-quality machining without generating machining steps that are a problem when axes for driving are switched within the framework of the related art.

The above-described numerical control device preferably has a configuration in which the preparation unit further has a feed control condition management unit as segmentalized control means; the feed control condition management unit stores axis acceleration/deceleration conditions including allowed maximum values of speed, acceleration, and jerk about each axis for driving obtained by taking first-order derivative, second-order derivative, and third-order derivative of each axis coordinate with respect to time; the first control unit further has a tool path intervening variable representation unit as segmentalized sub-means; the tool path intervening variable representation unit represents the tool trajectory included in the tool path by a function having s, which is an integral length of a movement distance including posture variations of the tool trajectory, as an intervening variable, converts the tool feed speed command into a speed of the s, and converts the tool path into a tool path represented as a function having the s as an intervening variable; the spindle path calculation unit finds a spindle path functionally represented with the s as an intervening variable; the axis path calculation unit finds an axis path functionally represented with the s as an intervening variable; the third control unit has as segmentalized sub-means an acceleration/deceleration interpolation control unit and a pulse interpolation unit; the acceleration/deceleration interpolation control unit determines values of the s at various points of time on the basis of the tool feed speed command and the axis acceleration/deceleration condition; the pulse interpolation unit finds values of the s for each interpolation period on the basis of the determined values of the s at various points of time, finds axis coordinates corresponding to the found values of s for each interpolation period, calculates a movement amount about each axis for driving for each of the interpolation periods from the axis coordinates, and outputs the movement amounts to the motors; the axis configuration management unit stores in the machine information memory unit an axis partial derivative value acquisition function for determining values of first-order, second-order, and third-order partial derivatives of the axis coordinates taken with respect to components of the spindle position on the basis of the inverse kinematic relationship in addition to the spindle-axis conversion function, and stores, for each axis for driving, in the preparation information memory unit an axis path correction allowed error, which is a position error allowed for correction of the axis path; the acceleration/deceleration interpolation control unit includes as further segmentalized sub-means a block smooth interpolation unit, a corner smooth interpolation unit, a feed control condition transform unit, and an intervening variable acceleration/deceleration determination unit; the block smooth interpolation unit determines whether or not at least either of a start point and an end point is smoothly connected to an adjacent block for each command block and each axis for driving, and when smooth connection is realized in the start point, finds a first-order derivative value and a second-order derivative value obtained with respect to the adequate s common to the start point of the present block for which the determination has been performed and an end point of a block immediately preceding the present block, stipulates the found derivative values as a start point connection condition, while when smooth connection is realized in the end point, finds a first-order derivative value and a second-order derivative value obtained with respect to the adequate s common to the end point of the present block and a start point of a block immediately following the present block, stipulates the found derivative values as an end point connection condition, finds a smooth block curve having a first-order derivative value and a second-order derivative value stipulated by at least either of the start point connection conditions and the end point connection condition, and performs correction of an axis path by replacing the present block with the smooth block curve; and the corner smooth interpolation unit determines whether or not the first-order derivative value and the second-order derivative value obtained with respect to the s in the end point of each command block of the axis path match respective values in the start point of the next command block in a series of axis paths that should be performed continuously and have been found by the block smooth interpolation unit, and when either of the first-order derivative value and the second-order derivative value does not match, finds a smooth corner curve that has a first-order derivative value and a second-order derivative value matching the first-order derivative value and the second-order derivative value of the command block for which matching of the derivative values has been checked and the command block following this command block, and that has an error with respect to the original axis path equal to or less than the axis path correction allowed error, and also has continuously changing first-order derivative value and second-order derivative value in order to eliminate a discontinuous variation portion of the first-order derivative value and the second-order derivative value of each axis path obtained with respect to the s, and performs correction of the axis path by replacing with the smooth corner curve an axis path between a contact point of the smooth corner curve with the command block for which matching of the derivative values has been checked and a contact point of the smooth corner curve with the next command block; the feed control condition transform unit derives an intervening variable acceleration/deceleration condition, which is a condition equation for the s, a speed of the s, an acceleration of the s, and a jerk of the s in each portion of the axis path, by using the spindle-axis conversion function and the axis partial derivative value acquisition function under the axis acceleration/deceleration condition; the intervening variable acceleration/deceleration determination unit finds an intervening variable time function s(t), which is a functional representation of the s with time on the basis of the intervening variable acceleration/deceleration condition and the conditions under which the s is within the feed speed command range and the highest speed of the s is attained; and the pulse interpolation unit calculates a movement amount about each axis for driving for each interpolation period on the basis of the intervening variable time function and outputs the calculated movement amounts to the motors.

With such a configuration, the axis path is corrected to an axis path with continuous first-order and second-order derivatives with respect to a sector of continuous drive, thereby ensuring a continuous variation of acceleration. Furthermore, one-shot interpolation can be performed by which a movement amount is found for each interpolation period by taking into account the acceleration and jerk limits and directly outputting the found movement amounts for each interpolation period to the motors. Further, in the above-described configuration, additional acceleration/deceleration interpolation processing is not required and extra errors are not generated. Therefore, the acceleration/deceleration control can be conducted close to a margin of axes for driving. In particular, a machine-friendly smooth acceleration/deceleration control can be realized even in curved surface machining based on short linear interpolation commands that are often used in machining of molds for production of automobiles and aircraft parts, or in machining based on spline interpolation commands or NURBS curve commands. Moreover, with such a configuration, one software package that can be shared by all machine tools may be created. Portions dependent on the configuration of axes for driving include only the spindle-axis conversion function based on the inverse kinematic relationship and the axis partial derivative value acquisition function, and once these spindle-axis conversion function and axis partial derivative value acquisition function have been created and stored in a storage unit, they can be shared by retrieving from the storage unit.

In this case, when a first-order derivative value and a second-order derivative value are stipulated in both the start point and the end point of the block, the smooth block curve is preferably obtained by connecting three curves represented by third-order polynomials of the s so that the first-order derivative value and the second-order derivative value change continuously; and the smooth corner curve is constituted by connecting the three curves represented by third-order polynomials of the s so that the first-order derivative value and the second-order derivative value change continuously.

The invention claimed is:

1. A numerical control device that controls a machine tool having at least a spindle for mounting a tool, a spindle head that fixedly holds the spindle, a machine table on which a machining object is fixedly disposed, the relative positional relationship between the spindle head and the machine table including a rotation posture being controlled about a plurality of axes for driving, and motors adapted for drive about each of axes, with a preparatory reference coordinate system, in which orientations of coordinate axes and a position of an original point are fixed, being set on the machine table, the numerical control device having a preparation unit, a first control unit, a second control unit, and a third control unit;

wherein the preparation unit has at least an NC program management unit, a preparatory information management unit, and a tool information management unit as segmentalized sub-means;

the NC program management unit stores in a preparation information memory unit a NC program having described therein a trajectory of a tool position, which is a position including a tool posture in a program coordinate system fixed to the machining object, a tool path formed of a tool feed speed command indicating a feed speed thereof, and an as-needed tool path correction command;

the preparatory information management unit stores in the preparation information memory unit preparatory information, which is information on a position that is in the preparatory reference coordinate system and composed of original point coordinate in the program coordinate system and posture angles indicating orientations of coordinate axis cosines, as an arrangement position including a posture of the machining object to the machine table;

the tool information management unit stores in the preparation information memory unit tool information including a shape of the tool used, a length of the tool, and dimensional information on a correction amount of a tool radius;

the first control unit has as segmentalized sub-means an NC program read unit and a tool path correction unit;

the NC program read unit reads the tool path and the tool path correction command described in the NC program and stores the tool path and the tool path correction command in a path computation memory unit;

the tool path correction unit corrects the tool path according to the tool path correction command;

the second control unit finds an axis path corresponding to a trajectory of axis coordinates, which are position coordinates about all axes for driving, from the tool path on the basis of the preparatory information and the tool information by taking into account specific features of configuration of the axes for driving, and stores the found axis path in the path computation memory unit;

the third control unit finds a movement amount about each axis for driving for each interpolation period from the axis path and outputs the found movement amounts to the motors;

the preparation unit further has an axis configuration management unit as segmentalized sub-means;

the axis configuration management unit stores in a machine information memory unit a spindle-axis conversion function that converts into the axis coordinates the spindle position based on an inverse kinematic relationship that is determined by the configuration of the axes for driving, the relationship indicating a correlation between the axis coordinates and a spindle position, which is position information obtained by representing a position of the spindle, including the rotation posture thereof, in the preparatory reference coordinate system;

the second control unit has a spindle path calculation unit and an axis path calculation unit as segmentalized sub-means;

the spindle path calculation unit converts the tool path into a spindle path, which is a trajectory of the spindle position, on the basis of the preparatory information and the tool information, irrespectively of the configuration of the axes for driving, and stores the spindle path in the path computation memory unit; and the axis path calculation unit converts the spindle path into the axis path by using the spindle-axis conversion function, and stores the axis path in the path computation memory unit.

2. The numerical control device according to claim 1, wherein the preparation unit further has a redundancy restraint condition addition unit as a segmentalized sub-unit;

the redundancy restraint condition addition unit stores in the path computation memory unit a redundancy restraint condition, which is an additional condition that, when this condition is added to the inverse kinematic function, can regulate to one the number of axis coordinates corresponding to the spindle position in the case in which the machine tool has an axis configuration having a redundancy such that when the axis coordinates corresponding to the spindle position are found on the basis of the inverse kinematic relationship, an infinite number of solutions is obtained, and the spindle-axis conversion function is a function for calculating the one axis coordinate corresponding to the spindle position by using together the inverse kinematic function and the redundancy restraint condition stored in the path computation memory unit.

3. The numerical control device according to claim 1, wherein the preparation unit further has a feed control condition management unit as segmentalized control means;

the feed control condition management unit stores axis acceleration/deceleration conditions including allowed maximum values of speed, acceleration, and jerk about each axis for driving obtained by taking first-order derivative, second-order derivative, and third-order derivative of each axis coordinate with respect to time;

the first control unit further has a tool path intervening variable representation unit as segmentalized sub-means;

the tool path intervening variable representation unit represents the tool trajectory included in the tool path by a function having s, which is an integral length of a movement distance including posture variations of the tool trajectory, as an intervening variable, converts the tool feed speed command into a speed of the s, and converts the tool path into a tool path represented as a function having the s as an intervening variable;

the spindle path calculation unit finds a spindle path functionally represented with the s as an intervening variable;

the axis path calculation unit finds an axis path functionally represented with the s as an intervening variable;

the third control unit has as segmentalized sub-means an acceleration/deceleration interpolation control unit and a pulse interpolation unit;

the acceleration/deceleration interpolation control unit determines values of the s at various points of time on the basis of the tool feed speed command and the axis acceleration/deceleration condition;

the pulse interpolation unit finds values of the s for each interpolation period on the basis of the determined values of the s at various points of time, finds axis coordinates corresponding to the found values of s for each interpolation period, calculates a movement amount about each axis for driving for each of the interpolation periods from the axis coordinates, and outputs the movement amounts to the motors;

the axis configuration management unit stores in the machine information memory unit an axis partial derivative value acquisition function for determining values of first-order, second-order, and third-order partial derivatives of the axis coordinates taken with respect to components of the spindle position on the basis of the inverse kinematic relationship in addition to the spindle-axis conversion function, and stores, for each axis for driving, in the preparation information memory unit an axis path correction allowed error, which is a position error allowed for correction of the axis path;

the acceleration/deceleration interpolation control unit includes as further segmentalized sub-means a block smooth interpolation unit, a corner smooth interpolation unit, a feed control condition transform unit, and an intervening variable acceleration/deceleration determination unit;

the block smooth interpolation unit determines whether or not at least either of a start point and an end point is smoothly connected to an adjacent block for each command block and each axis for driving, and when smooth connection is realized in the start point, finds a first-order derivative value and a second-order derivative value obtained with respect to the adequate s common to the start point of the present block for which the determination has been performed and an end point of a block immediately preceding the present block, stipulates the found derivative values as a start point connection condition, while when smooth connection is realized in the end point, finds a first-order derivative value and a second-order derivative value obtained with respect to the adequate s common to the end point of the present block and a start point of a block immediately following the present block, stipulates the found derivative values as an end point connection condition, finds a smooth block curve having a first-order derivative value and a second-order derivative value stipulated by at least either of the start point connection conditions and the end point connection condition, and performs correction of an axis path by replacing the present block with the smooth block curve; and the corner smooth interpolation unit determines whether or not the first-order derivative value and the second-order derivative value obtained with respect to the s in the end point of each command block of the axis path match respective values in the start point of the next command block in a series of axis paths that should be performed continuously and have been found by the block smooth interpolation unit, and when either of the first-order derivative value and the second-order derivative value does not match, finds a smooth corner curve that has a first-order derivative value and a second-order derivative value matching the first-order derivative value and the second-order derivative value of the command block for which matching of the derivative values has been checked and the command block following this command block, and that has an error with respect to the original axis path equal to or less than the axis path correction allowed error, and also has continuously changing first-order derivative value and second-order derivative value in order to eliminate a discontinuous variation portion of the first-order derivative value and the second-order derivative value of each axis path obtained with respect to the s, and performs correction of the axis path by replacing with the smooth corner curve an axis path between a contact point of the smooth corner curve with the command block for which matching of the derivative values has been checked and a contact point of the smooth corner curve with the next command block;

the feed control condition transform unit derives an intervening variable acceleration/deceleration condition, which is a condition equation for the s, a speed of the s, an acceleration of the s, and a jerk of the s in each portion of the axis path, by using the spindle-axis conversion function and the axis partial derivative value acquisition function under the axis acceleration/deceleration condition;

the intervening variable acceleration/deceleration determination unit finds an intervening variable time function s(t), which is a functional representation of the s with time on the basis of the intervening variable acceleration/deceleration condition and the conditions under which the s is within the feed speed command range and the highest speed of the s is attained; and the pulse interpolation unit calculates a movement amount about each axis for driving for each interpolation period on the basis of the intervening variable time function and outputs the calculated movement amounts to the motors.

4. The numerical control device according to claim 3, wherein when a first-order derivative value and a second-order derivative value are stipulated in both the start point and the end point of the block, the smooth block curve is obtained by connecting three curves represented by third-order polynomials of the s so that the first-order derivative value and the second-order derivative value change continuously; and the smooth corner curve is constituted by connecting the three curves represented by third-order polynomials of the s so that the first-order derivative value and the second-order derivative value change continuously.

* * * * *